(12) United States Patent
Russakoff

(10) Patent No.: US 7,792,348 B2
(45) Date of Patent: Sep. 7, 2010

(54) METHOD AND APPARATUS OF USING PROBABILISTIC ATLAS FOR CANCER DETECTION

(75) Inventor: Daniel Russakoff, Mountain View, CA (US)

(73) Assignee: Fujifilm Corporation, Tokyo (JP)

( * ) Notice: Subject to any disclaimer, the term of this patent is extended or adjusted under 35 U.S.C. 154(b) by 931 days.

(21) Appl. No.: 11/640,947

(22) Filed: Dec. 19, 2006

(65) Prior Publication Data
US 2008/0144939 A1  Jun. 19, 2008

(51) Int. Cl.
*G06K 9/00* (2006.01)
(52) U.S. Cl. ............................ 382/132; 382/228
(58) Field of Classification Search ............ 382/128, 382/132, 215, 216, 220, 228; 378/37
See application file for complete search history.

(56) References Cited

U.S. PATENT DOCUMENTS

| | | | |
|---|---|---|---|
| 2006/0008149 A1* | 1/2006 | Tu et al. ............... | 382/190 |
| 2007/0081712 A1* | 4/2007 | Huang et al. .......... | 382/128 |
| 2008/0039723 A1* | 2/2008 | Suri et al. ............. | 600/437 |

OTHER PUBLICATIONS

T.F. Cootes, C.J. Taylor, D.H. Cooper, J. Graham, in "Active Shape Models—Their Training and Application" Computer Vision and Image Understanding, vol. 61, Issue 1, Jan. 1995, p. 38-59.

"Automated Segmentation of Digitized Mammograms" by U. Bick, M.L. Giger, R. A. Schmidt, R. M. Nishikawa, D. E. Wolverton, K. Doi, Academic Radiol. 2 (1995), p. 1-9.

"Automatic Generation of Shape Models Using Nonrigid Registration with a Single Segmented Template Mesh" by G. Heitz, T. Rohlfing and C. Maurer, Proceedings of Vision, Modeling and Visualization, 2004.

"Automatic Construction of 3-D Statistical Deformation Models of the Brain Using Nonrigid Registration," by D. Rueckert, A. Frangi and J. Schnabel, IEEE Transactions on Medical Imaging, 22(8), p. 1014-1025, Aug. 2003.

* cited by examiner

*Primary Examiner*—Andrew W Johns
(74) *Attorney, Agent, or Firm*—Birch, Stewart, Kolasch & Birch, LLP

(57) ABSTRACT

Methods and apparatuses detect features. The method according to one embodiment accesses digital image data representing an object; accesses reference data including a shape model relating to shape variation from a baseline object, and a probabilistic atlas comprising probability for a feature in the baseline object; performs shape registration for the object by representing a shape of the object using the shape model, to obtain a registered shape; and determines probability for the feature in the object by generating a correspondence between a geometric element associated with the probabilistic atlas and a geometric element associated with the registered shape.

20 Claims, 18 Drawing Sheets

METHOD AND APPARATUS OF USING PROBABILISTIC ATLAS FOR CANCER DETECTION

CROSS REFERENCE TO RELATED APPLICATIONS

This non-provisional application is related to co-pending non-provisional applications titled "Method and Apparatus for Probabilistic Atlas Based on Shape Modeling Technique" and "Method and Apparatus of Using Probabilistic Atlas for Feature Removal/Positioning" filed concurrently herewith, the entire contents of which are hereby incorporated by reference.

BACKGROUND OF THE INVENTION

1. Field of the Invention

The present invention relates to a digital image processing technique, and more particularly to a method and apparatus for processing breast images and detecting cancer in breast images.

2. Description of the Related Art

Mammography images and identification of abnormal structures in mammography images are important tools for diagnosis of medical problems of breasts. For example, identification of cancer structures in mammography images is important and useful for prompt treatment and prognosis.

Reliable cancer detection, however, is difficult to achieve because of variations in anatomical shapes of breasts and medical imaging conditions. Such variations include: 1) anatomical shape variations between breasts of various people or between breasts of the same person; 2) lighting variations in breast images taken at different times; 3) pose and view changes in mammograms; 4) change in anatomical structure of breasts due to aging of people; etc. Such medical imaging variations pose challenges for both manual identification and computer-aided detection of cancer in breasts.

Breast shapes, and structures inside breasts are important features in mammography images. Accurate breast shapes may convey significant information relating to breast deformation, size, and shape evolution. Inaccurate breast shapes, on the other hand, may obscure abnormal breast growth and deformation. Mammography images with unusual or abnormal breast shapes pose challenges when used in software applications that process and compare breast images. Non-uniform background regions, tags, labels, or scratches present in mammography images may also obscure or change the breast shapes and create problems for detection of cancer in breasts.

Disclosed embodiments of this application address these and other issues by using methods and apparatuses for cancer detection based on a shape modeling technique for breasts and using a probabilistic atlas for cancer locations in breasts. The methods and apparatuses generate an image for probability of cancer in a breast image using a probabilistic atlas. The methods and apparatuses detect cancer in breasts by representing shapes of breasts using a shape model, and comparing shape modeled breasts. The methods and apparatuses can be used for detection of other abnormal structures in breasts using a probabilistic atlas for locations of abnormal structures in breasts. The methods and apparatuses can be used for detection of abnormal structures or cancer in other anatomical parts besides breasts, by using probabilistic atlases for locations of abnormal structures or cancer formation in anatomical parts.

SUMMARY OF THE INVENTION

The present invention is directed to methods and apparatuses for detecting features. According to a first aspect of the present invention, a feature detection method comprises: accessing digital image data representing an object; accessing reference data including a shape model relating to shape variation from a baseline object, and a probabilistic atlas comprising probability for a feature in the baseline object; performing shape registration for the object by representing a shape of the object using the shape model, to obtain a registered shape; and determining probability for the feature in the object by generating a correspondence between a geometric element associated with the probabilistic atlas and a geometric element associated with the registered shape.

According to a second aspect of the present invention, a feature detection method comprises: accessing digital image data representing a plurality of images including a plurality of objects; accessing reference data including a shape model relating to shape variation from a baseline object; performing shape registration for the plurality of objects by representing shapes of the plurality of objects using the shape model, to obtain a plurality of registered shapes for the plurality of objects; and determining presence of a feature in a first object from the plurality of objects, the determining step including warping the plurality of registered shapes to the baseline object, to obtain a plurality of warped shapes, and determining differences between a warped shape associated with the first object and a second warped shape from the plurality of warped shapes.

According to a third aspect of the present invention, a feature detection apparatus comprises: an image data input unit for providing digital image data representing an object; a reference data unit for providing reference data including a shape model relating to shape variation from a baseline object, and a probabilistic atlas comprising probability for a feature in the baseline object; a shape registration unit for performing shape registration for the object by representing a shape of the object using the shape model, to obtain a registered shape; and a feature analysis unit for determining probability for the feature in the object by generating a correspondence between a geometric element associated with the probabilistic atlas and a geometric element associated with the registered shape.

According to a fourth aspect of the present invention, a feature detection apparatus comprises: an image data input unit for providing digital image data representing a plurality of images including a plurality of objects; a reference data unit for providing reference data including a shape model relating to shape variation from a baseline object; a shape registration unit for performing shape registration for the plurality of objects by representing shapes of the plurality of objects using the shape model, to obtain a plurality of registered shapes for the plurality of objects; and a feature analysis unit for determining presence of a feature in a first object from the plurality of objects, the feature analysis unit determining presence of the feature by warping the plurality of registered shapes to the baseline object, to obtain a plurality of warped shapes, and determining differences between a warped shape associated with the first object and a second warped shape from the plurality of warped shapes.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
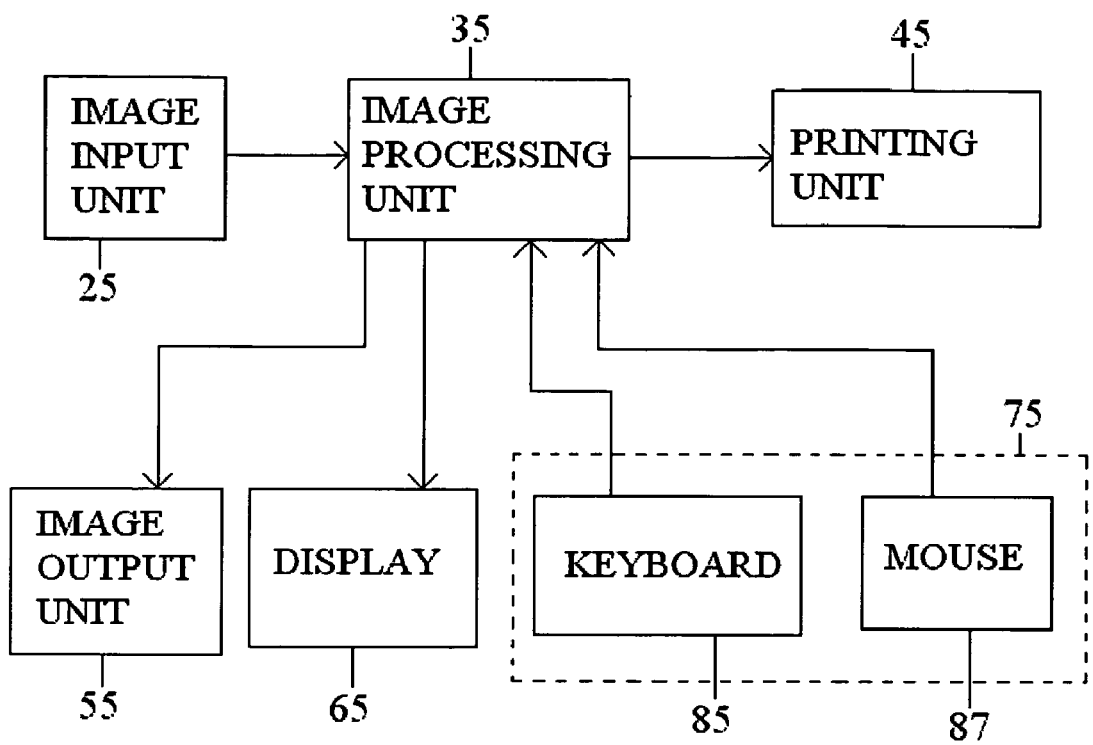
FIG. 1 is a general block diagram of a system including an image processing unit for cancer detection using a probabilistic atlas according to an embodiment of the present invention.

Aspects of the invention are more specifically set forth in the accompanying description with reference to the appended figures. FIG. 1 is a general block diagram of a system including an image processing unit for cancer detection using a probabilistic atlas according to an embodiment of the present invention. The system 95 illustrated in FIG. 1 includes the following components: an image input unit 25; an image processing unit 35; a display 65; an image output unit 55; a user input unit 75; and a printing unit 45. Operation of the system 95 in FIG. 1 will become apparent from the following discussion.

The image input unit 25 provides digital image data. Digital image data may be medical images such as mammogram images, brain scan images, X-ray images, etc. Image input unit 25 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

The image processing unit 35 receives digital image data from the image input unit 25 and performs cancer detection using a probabilistic atlas in a manner discussed in detail below. A user, e.g., a radiology specialist at a medical facility, may view the output of image processing unit 35, via display 65 and may input commands to the image processing unit 35 via the user input unit 75. In the embodiment illustrated in FIG. 1, the user input unit 75 includes a keyboard 85 and a mouse 87, but other conventional input devices could also be used.

In addition to performing cancer detection using a probabilistic atlas in accordance with embodiments of the present invention, the image processing unit 35 may perform additional image processing functions in accordance with commands received from the user input unit 75. The printing unit 45 receives the output of the image processing unit 35 and generates a hard copy of the processed image data. In addition or as an alternative to generating a hard copy of the output of the image processing unit 35, the processed image data may be returned as an image file, e.g., via a portable recording medium or via a network (not shown). The output of image processing unit 35 may also be sent to image output unit 55 that performs further operations on image data for various purposes. The image output unit 55 may be a module that performs further processing of the image data; a database that collects and compares images; a database that stores and uses cancer detection results received from image processing unit 35; etc.

Figure 2:
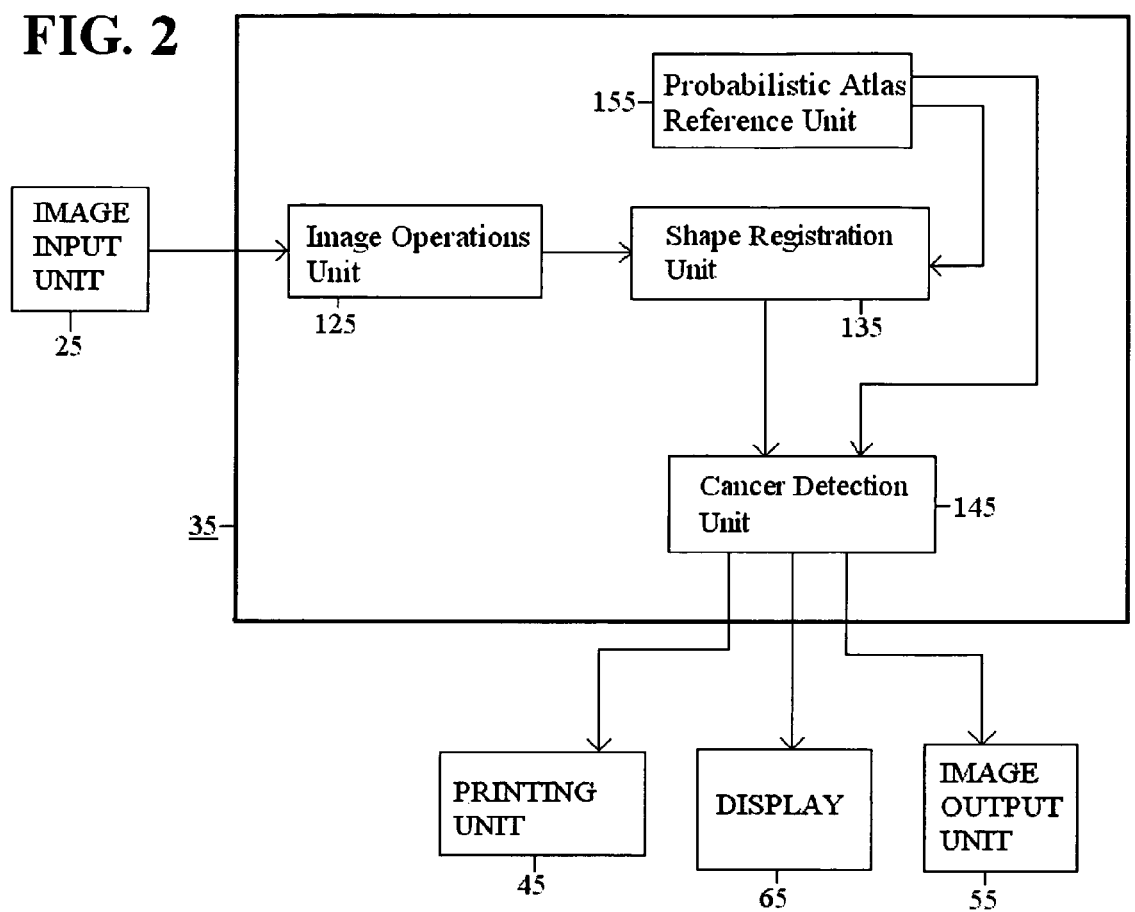
FIG. 2 is a block diagram of an image processing unit for cancer detection using a probabilistic atlas according to an embodiment of the present invention.

FIG. 2 is a block diagram of an image processing unit 35 for cancer detection using a probabilistic atlas according to an embodiment of the present invention. As shown in FIG. 2, the image processing unit 35 according to this embodiment includes: an image operations unit 125; a shape registration unit 135; a cancer detection unit 145; and a probabilistic atlas reference unit 155. Although various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 35 illustrated in FIG. 2 performs preprocessing and preparation of digital image data, registration of shapes of anatomical objects from digital image data, and detection of cancer formations in anatomical objects in digital image data. Image operations unit 125 receives digital image data from image input unit 25. Digital image data can be medical images, which may be obtained through medical imaging. Digital image data may be, for example, mammography images, brain scan images, chest X-ray images, etc.

Operation of image processing unit 35 will be next described in the context of mammography images, for using a probabilistic atlas and/or a shape model for cancer detection in mammography images. However, the principles of the current invention apply equally to other areas of medical image processing, and to cancer detection using a probabilistic atlas and/or a shape model for other types of anatomical objects besides breasts.

Image operations unit 125 receives a set of breast images from image input unit 25 and may perform preprocessing and preparation operations on the breast images. Preprocessing and preparation operations performed by image operations unit 125 may include resizing, cropping, compression, color correction, etc., that change size and/or appearance of breast images. Image operations unit 125 may also extract breast shape information from breast images, and may store or extract information about breast images, such as views of mammograms.

Image operations unit 125 sends the preprocessed breast images to shape registration unit 135, which performs shape registration for breasts in the breast images. For shape registration, shape registration unit 135 represents breast shapes using a shape model, to obtain registered breast shapes. Shape registration unit 135 retrieves information about the shape model from probabilistic atlas reference unit 155, which stores parameters that define the shape model. Probabilistic atlas reference unit 155 also stores one or more probabilistic cancer atlases that include information about probability of cancer at locations inside breasts, for various views of breasts recorded in mammograms.

Cancer detection unit 145 receives registered breast shapes from shape registration unit 135. Cancer detection unit 145 also retrieves probabilistic cancer atlas data from probabilistic atlas reference unit 155. Using probabilistic cancer atlas data, cancer detection unit 145 detects presence or probability of cancer in registered breast shapes. The outputs of cancer detection unit 145 are locations and probability estimates for cancer structures in breasts. Cancer detection unit 145 outputs breast images, together with locations and probability estimates for cancer structures in breasts. Such breast images with locations and probability estimates for cancer structures may be output to image output unit 55, printing unit 45, and/or display 65.

Operation of the components included in image processing unit 35 illustrated in FIG. 2 will be next described with reference to FIG. 3. Inage operations unit 125, shape registration unit 135, cancer detection unit 145, and probabilistic atlas reference unit 155 are software systems/applications. Image operations unit 125, shape registration unit 135, cancer detection unit 145, and probabilistic atlas reference unit 155 may also be purpose built hardware such as FPGA, ASIC, etc.

Figure 3:
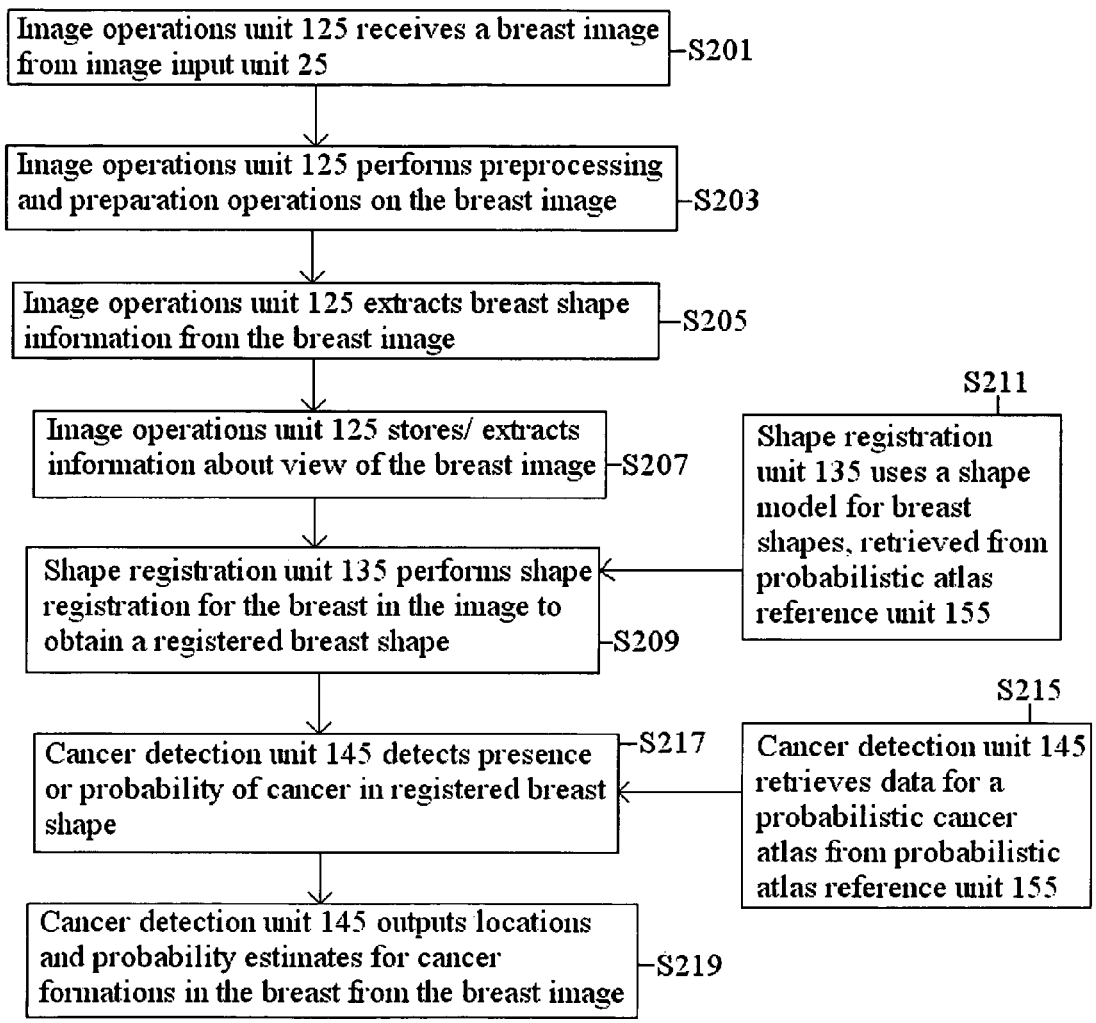
FIG. 3 is a flow diagram illustrating operations performed by an image processing unit for cancer detection using a probabilistic atlas according to an embodiment of the present invention illustrated in FIG. 2.

FIG. 3 is a flow diagram illustrating operations performed by an image processing unit 35 for cancer detection using a probabilistic atlas according to an embodiment of the present invention illustrated in FIG. 2.

Image operations unit 125 receives a breast image from image input unit 25 (S201). Image operations unit 125 performs preprocessing and preparation operations on the breast image (S203). Preprocessing and preparation operations performed by image operations unit 125 may include resizing, cropping, compression, color correction, etc., that change size and/or appearance of breast images. Image operations unit 125 also extracts breast shape information from the breast image (S205), and stores or extracts information about the view of the breast image (S207).

Image operations unit 125 sends the preprocessed breast image to shape registration unit 135, which performs shape registration for the breast in the image to obtain a registered breast shape (S209). For shape registration, shape registration unit 135 uses a shape model for breast shapes (S211). The shape model describes how shape varies from breast to breast. The shape model is retrieved from probabilistic atlas reference unit 155 (S211).

Cancer detection unit 145 receives the registered breast shape from shape registration unit 135. Cancer detection unit 145 retrieves data for a probabilistic cancer atlas from probabilistic atlas reference unit 155 (S215). The probabilistic cancer atlas includes information about probability of cancer at various locations inside breasts. Using probabilistic cancer atlas data, cancer detection unit 145 detects presence or probability of cancer in the registered breast shape (S217). Cancer detection unit 145 outputs locations and probability estimates for cancer formations in the breast from the breast image (S219). Such output results may be output to image output unit 55, printing unit 45, and/or display 65.

Figure 4:
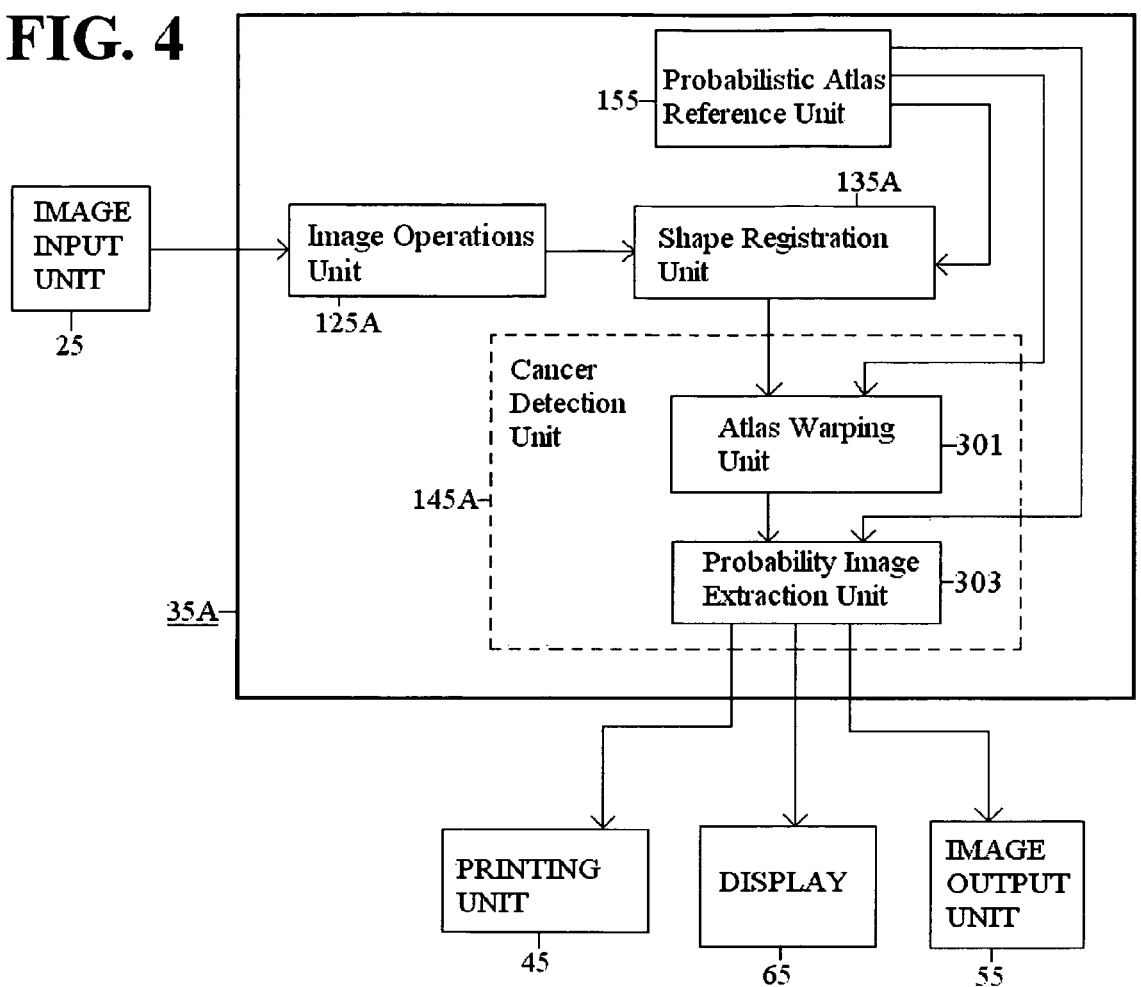
FIG. 4 is a block diagram of an image processing unit for cancer detection using a probabilistic atlas to obtain a cancer probability image according to an embodiment of the present invention illustrated in FIG. 2.

FIG. 4 is a block diagram of an image processing unit 35A for cancer detection using a probabilistic atlas to obtain a cancer probability image according to an embodiment of the present invention illustrated in FIG. 2. As shown in FIG. 4, the image processing unit 35A according to this embodiment includes: an image operations unit 125A; a shape registration unit 135A; an atlas warping unit 301; a probability image extraction unit 303; and a probabilistic atlas reference unit 155. The atlas warping unit 301 and the probability image extraction unit 303 are included in a cancer detection unit 145A.

Image operations unit 125A receives a set of breast images from image input unit 25, and may perform preprocessing and preparation operations on the breast images. Preprocessing and preparation operations performed by image operations unit 125A may include resizing, cropping, compression, color correction, etc., that change size and/or appearance of breast images. Image operations unit 125A creates breast mask images that identify pixels belonging to breasts in the breast images. Breast mask images are also called breast shape silhouettes in the current application. Breast mask images may be created, for example, by detecting breast borders or breast clusters, for the breasts shown in the breast images. Image operations unit 125A may also store/extract information about breast images, such as views of mammograms.

Image operations unit 125A sends the breast mask images to shape registration unit 135A, which performs shape registration for breast mask images. For shape registration, shape registration unit 135A describes breast mask images using a shape model, to obtain registered breast shapes. Shape registration unit 135A retrieves information about the shape model from probabilistic atlas reference unit 155, which stores parameters that define the shape model.

Each mammogram view is associated with a shape model. A shape model may consist of a baseline breast atlas shape and a set of deformation modes. In one embodiment, the baseline breast atlas shape is a mean breast shape representing the average shape of a breast for a given mammogram view, but other baseline breast atlas shapes may also be used. The deformation modes define directions of deformation for contour points of breasts in breast images onto corresponding contour points of the breast in the baseline breast atlas shape. The shape model is obtained by training off-line, using large sets of training breast images. A baseline breast atlas shape can be obtained from sets of training breast images. Deformation modes, describing variation of shapes of training breast images from the baseline breast atlas shape, are also obtained by training. Details on generation of a breast shape model using sets of training breast images can be found in the co-pending non-provisional application titled "Method and Apparatus for Probabilistic Atlas Based on Shape Modeling Technique", the entire contents of which are hereby incorporated by reference.

A breast mask shape may then be represented using the shape model from probabilistic atlas reference unit 155. A breast mask shape may be expressed as a function of the baseline breast atlas shape, which may be a mean breast shape ($B_a$), and of shape model deformation modes, as:

$$\text{Breast Shape} = p + B_a + \sum_{i=1}^{k} \alpha_i L_i \quad (1)$$

where p is an offset (such as a 2D offset) to the mean breast shape $B_a$ to account for a rigid translation of the entire shape, $L_i$, i=1 . . . k is the set of deformation modes of the shape model, and $\alpha_i$, i=1 . . . k are a set of parameters that define the deviations of Breast Shape from the mean breast shape along the axes associated with the principal deformation modes. The parameters $\alpha_i$, i=1 . . . k are specific to each breast mask. Hence, an arbitrary breast mask may be expressed as a sum of the fixed mean breast shape ($B_a$), a linear combination of fixed deformation modes $L_i$ multiplied by coefficients $\alpha_i$, and a 2D offset p. Details on how a mean breast shape/baseline breast atlas shape $B_a$ and deformation modes $L_i$, i=1 . . . k are obtained during training, using training breast images can be found in the co-pending non-provisional application titled "Method and Apparatus for Probabilistic Atlas Based on Shape Modeling Technique", the entire contents of which are hereby incorporated by reference.

Each mammogram view $v_i$ is associated with one mean breast shape ($B_{a\_vi}$) specific to that view, and with a set of deformation modes $L_{i\_vi}$, i=1 . . . $k_{vi}$ specific to that view.

For each breast mask image $B_{mask\_new}$ received from image operations unit 125A, shape registration unit 135A retrieves the mean breast shape ($B_{a\_vi}$) and the set of deformation modes $L_{i\_vi}$, i=1 . . . $k_{vi}$ associated with the view $v_i$ of the breast mask image $B_{mask\_new}$. Shape registration unit 135A next identifies the parameters $\alpha_i$, i=1 . . . $k_{vi}$ and a 2D offset p for the breast mask image $B_{mask\_new}$, to fit the breast mask image $B_{mask\_new}$ with its correct shape representation in the form:

$$\text{Breast Shape} = B_{a\_vi} + p + \sum_{i=1}^{k_{vi}} \alpha_i L_i.$$

Atlas warping unit 301 receives the registration results for the breast mask image $B_{mask\_new}$ from shape registration unit 135A. Registration results for the breast mask image $B_{mask\_new}$ include the parameters $\alpha_i$, i=1 . . . $k_{vi}$ for the breast mask image $B_{mask\_new}$, the 2D offset p, and the functional representation $$\text{Breast Shape} = B_{a\_vi} + p + \sum_{i=1}^{k_{vi}} \alpha_i L_i$$

for the breast mask image $B_{mask\_new}$. Atlas warping unit 301 then warps the breast mask image $B_{mask\_new}$ to a probabilistic cancer atlas $A_{vi}$ specific to the view $v_i$ of the breast mask image $B_{mask\_new}$. The probabilistic cancer atlas data is stored in probabilistic atlas reference unit 155.

The probabilistic cancer atlas $A_{vi}$ includes an image of the mean breast shape $B_{a\_vi}$ for view $v_i$, together with probabilities for cancer associated with each pixel in the mean breast shape $B_{a\_vi}$. Hence, the probabilistic cancer atlas $A_{vi}$ is a weighted pixel image, in which each pixel in the mean breast shape $B_{a\_vi}$ is weighted by a cancer probability for that pixel. Pixels in the mean breast shape $B_{a\_vi}$ may be weighted by cancer probabilities in a number of different ways. For example, the intensities of pixels in the mean breast shape $B_{a\_vi}$ may be set based on associated cancer probability; color of pixels in the mean breast shape $B_{a\_vi}$ may be set based on associated cancer probability; a separate data structure containing cancer probabilities may be associated with pixels in the mean breast shape $B_{a\_vi}$; etc.

The probabilistic cancer atlas is obtained by training off-line, using large sets of training breast images with previously identified cancer structures. The shapes of the training breast images are represented as linear combinations of deformation modes obtained during training. Using shape representations for the training breast images, previously identified cancer structures in the training breast images are mapped to the baseline breast atlas shape. By overlapping cancer positions from the training images onto the baseline breast atlas shape, a probabilistic atlas with the probability for cancer in the baseline breast atlas shape is obtained. Additional details on generation of a probabilistic atlas using sets of training breast images with previously identified cancer structures can be found in the co-pending non-provisional application titled "Method and Apparatus for Probabilistic Atlas Based on Shape Modeling Technique", the entire contents of which are hereby incorporated by reference.

After atlas warping unit 301 warps the breast mask image $B_{mask\_new}$ to probabilistic cancer atlas $A_{vi}$, a warped breast mask image $B_{mask\_new\_warped}$ is obtained. Cancer probability weights from the probabilistic cancer atlas $A_{vi}$ are associated with pixels in the warped image $B_{mask\_new\_warped}$. Probability image extraction unit 303 receives the warped breast mask image $B_{mask\_new\_warped}$, as well as shape registration information of the form $$\text{Breast Shape} = B_{a\_vi} + p + \sum_{i=1}^{k_{vi}} \alpha_i L_i,$$

establishing a correspondence between pixels of $B_{mask\_new\_warped}$ and pixels of $B_{mask\_new}$. Hence, $B_{a\_vi}$ is the mean atlas silhouette for the view vi, while $B_{mask\_new\_warped}$ is the silhouette of $B_{mask\_new}$ warped into the mean atlas space.

Probability image extraction unit 303 warps the $B_{mask\_new\_warped}$ image back to the original $B_{mask\_new}$. A probability image $P_{mask\_new}$, is obtained, which includes an image of the breast mask image $B_{mask\_new}$, together with probabilities for cancer associated with each pixel in the breast mask image $B_{mask\_new}$. Hence, the probability image $P_{mask\_new}$ is a weighted pixel image, in which each pixel of the breast mask image $B_{mask\_new}$ is weighted by the cancer probability for that pixel. Probability image extraction unit 303 outputs the probability image $P_{mask\_new}$. The probability image $P_{mask\_new}$ may be output to image output unit 55, printing unit 45, and/or display 65.

Image operations unit 125A, shape registration unit 135A, atlas warping unit 301, probability image extraction unit 303, and probabilistic atlas reference unit 155 are software systems/applications. Image operations unit 125A, shape registration unit 135A, atlas warping unit 301, probability image extraction unit 303, and probabilistic atlas reference unit 155 may also be purpose built hardware such as FPGA, ASIC, etc.

Figure 5:
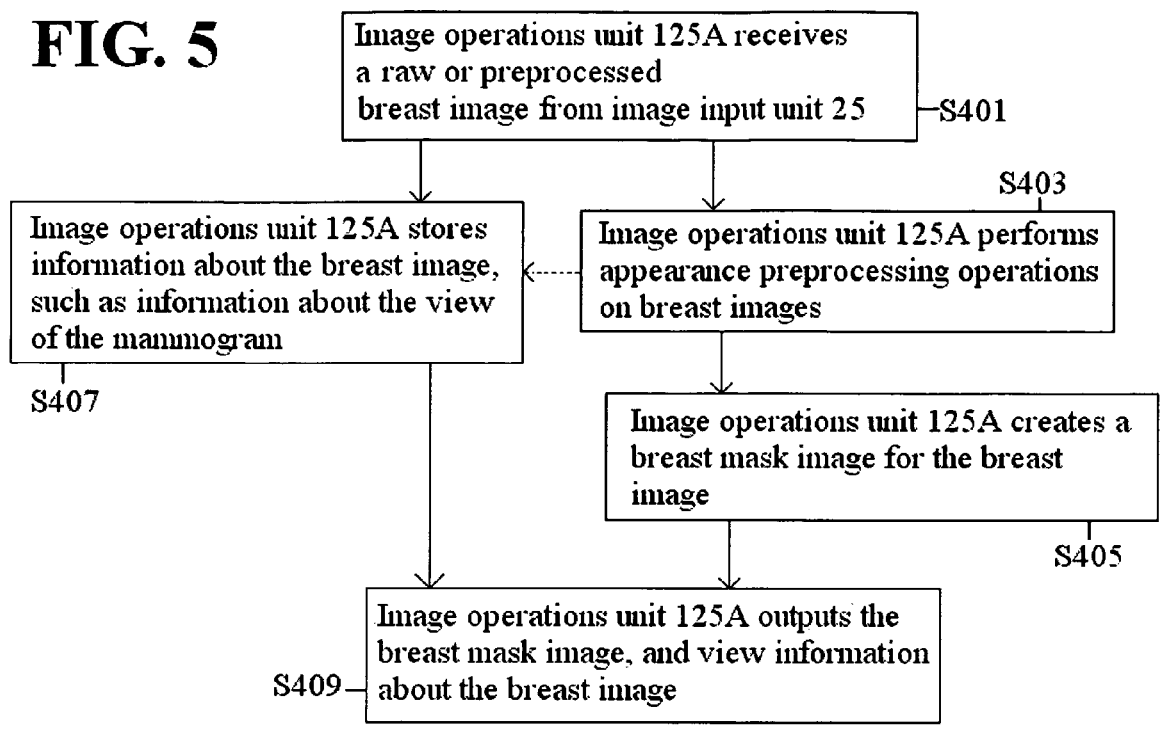
FIG. 5 is a flow diagram illustrating operations performed by an image F operations unit included in an image processing unit for cancer detection using a probabilistic atlas according to an embodiment of the present invention illustrated in FIG. 4.

FIG. 5 is a flow diagram illustrating operations performed by an image operations unit 125A included in an image processing unit 35A for cancer detection using a probabilistic atlas according to an embodiment of the present invention illustrated in FIG. 4.

Image operations unit 125A receives a raw or preprocessed breast image from image input unit 25 (S401). The breast image may be retrieved by image operations unit 125A from, for example, a breast imaging hospital apparatus, a database of breast images, etc. Image operations unit 125A may perform preprocessing operations on the breast image (S403). Preprocessing operations may include resizing, cropping, compression, color correction, etc.

Image operations unit 125A creates a breast mask image for the breast image (S405). The breast mask image may be created by detecting breast borders for the breast in the breast image. Image operations unit 125A may create a breast mask image by detecting breast borders using methods described in the US patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. With the techniques described in the "Method and Apparatus for Breast Border Detection" application, pixels in the breast image are represented in a multi-dimensional space, such as a 4-dimensional space with x-locations of pixels, y-locations of pixels, intensity value of pixels, and distance of pixels to a reference point. K-means clustering of pixels is run in the multi-dimensional space, to obtain clusters for the breast image. Cluster merging and connected components analysis is then run using relative intensity measures, brightness pixel values, and cluster size, to identify a cluster corresponding to the breast in the breast image. A set of pixels, or a mask, containing breast pixels is obtained. The set of pixels for a breast in a breast image, forms a breast mask $B_{mask}$ for that breast image.

Image operations unit 125A may also segment the breast area from the background in a mammogram, to create shape silhouettes, using methods described in the publication "Automated Segmentation of Digitized Mammograms" by Wirth, A. and Stapinski, M., Academic Radiology 2 (1995), p. 1-9, the entire contents of which are hereby incorporated by reference.

Other breast border detection techniques may also be used by image operations unit 125A to obtain a breast mask image.

Image operations unit 125A also stores information about the breast image, such as information about the view of the mammogram (S407). Examples of mammogram views are MLL (medio-lateral left), MLR (medio-lateral right), CCL (cranio-caudal left), CCR (cranio-caudal right), RCC, LRR, LMLO (left medio-lateral oblique), and RMLO (right medio-lateral oblique). Image operations unit 125A outputs the breast mask image, and view information about the breast image (S409), to shape registration unit 135A.

Figure 6:
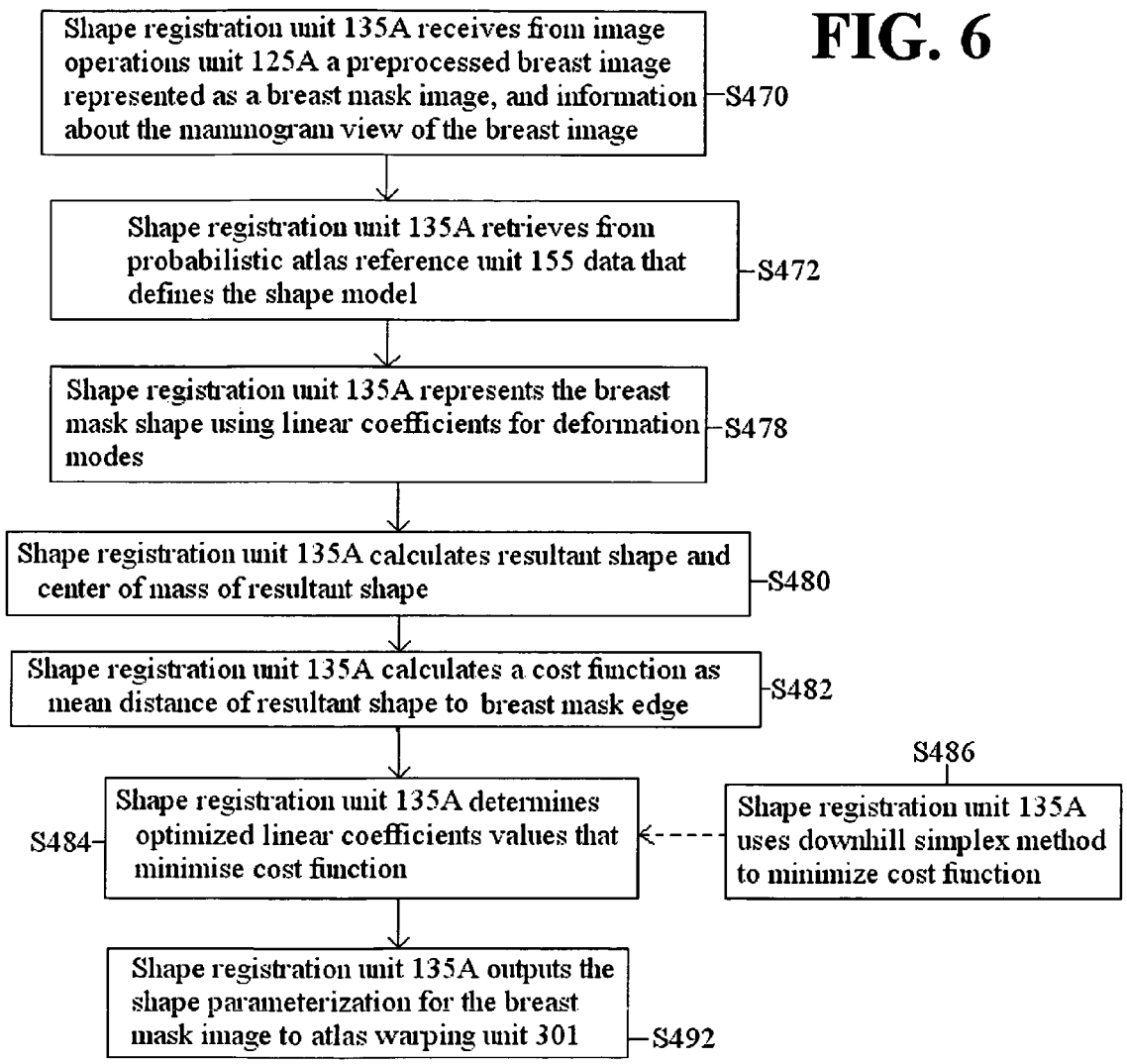
FIG. 6 is a flow diagram illustrating operations performed by a shape registration unit included in an image processing unit for cancer detection using a probabilistic atlas according to an embodiment of the present invention illustrated in FIG. 4.

FIG. 6 is a flow diagram illustrating operations performed by a shape registration unit 135A included in an image processing unit 35A for cancer detection using a probabilistic atlas according to an embodiment of the present invention illustrated in FIG. 4.

Shape registration unit 135A receives from image operations unit 125A a preprocessed breast image, represented as a breast mask image $B_{mask\_new}$ (S470). Information about the mammogram view $v_i$ of the breast image is also received (S470). Shape registration unit 135A retrieves from probabilistic atlas reference unit 155 data that defines the shape model for that view. Such data includes a mean breast shape $(B_{a\_vi})$, shape model deformation modes $L_i$, $i=1 \ldots k_{vi}$ for the view $v_i$ of the breast mask image $B_{mask\_new}$, and a 2D offset p to account for a rigid translation of the entire shape (S472).

Shape registration unit 135A fits the breast mask image $B_{mask\_new}$ with its correct shape representation as a linear combination of the deformation modes, $$\text{Shape} = B_{a\_vi} + p + \sum_{i=1}^{k_{vi}} \alpha_i L_i,$$

by determining parameters $\alpha_i$, $i=1 \ldots k_{vi}$ and 2D offset p.

To fit the breast mask image $B_{mask\_new}$ with its correct shape representation, shape registration unit 135A optimizes the $\alpha_i$ values, together with an x offset $p_x$ and a y offset $p_y$, for a total of k+2 parameters $(p_x, p_y, \alpha)$, where $\alpha=(\alpha_1, \alpha_2, \ldots, \alpha_k)$ and $p=(p_x, p_y)$ (S478). For optimization, shape registration unit 135A uses a cost function defined as the mean distance to edge. For a $(p_x, p_y, \alpha)$ parameter set, shape registration unit 135A calculates the new shape resulting from this parameter set by formula $$\text{Shape} = B_{a\_vi} + p + \sum_{i=1}^{k_{vi}} \alpha_i L_i \ (S480).$$

The center of mass (Shape.COM) of Shape is then calculated (S480). For each shape point on the exterior (border) of Shape, shape registration unit 135A generates a ray containing the Shape.COM and the shape point, finds the intersection point of the ray with the edge of $B_{mask\_new}$, and calculates how far the shape point is from the intersection point obtained in this manner. This technique is further illustrated in FIG. 8D. In an alternative embodiment, the minimum distance from the shape point to the edge of $B_{mask\_new}$ is calculated.

The mean of the distances between shape points and intersection points is then calculated (S482). Optimized $\alpha_i$ and p values are selected for which the mean attains a minimum (S484).

Shape registration unit 135A may use the downhill simplex method, also known as the Nelder-Mead or the amoeba algorithm (S486), to fit the breast mask image $B_{mask\_new}$ with its correct shape representation, by minimizing distances of edge points of Shape to points on the edge of the breast mask image $B_{mask\_new}$. The downhill simplex method is a single-valued minimization algorithm that does not require derivatives. The downhill simplex algorithm is typically very robust.

With the Nelder-Mead method, the k+2 parameters ($p_x$, $p_y$, $\alpha$) form a simplex in a multi-dimensional space. The Nelder-Mead method minimizes the selected cost function, by moving points of the simplex to decrease the cost function. A point of the simplex may be moved by reflections against a plane generated by other simplex points, reflection and expansion of the simplex obtained after reflection, contraction of the simplex, etc.

Once parameters of the shape model are optimized for the breast mask image $B_{mask\_new}$, shape registration unit 135A outputs the shape registration results for the breast mask image $B_{mask\_new}$ to the atlas warping unit 301 (S492).

Figure 7:
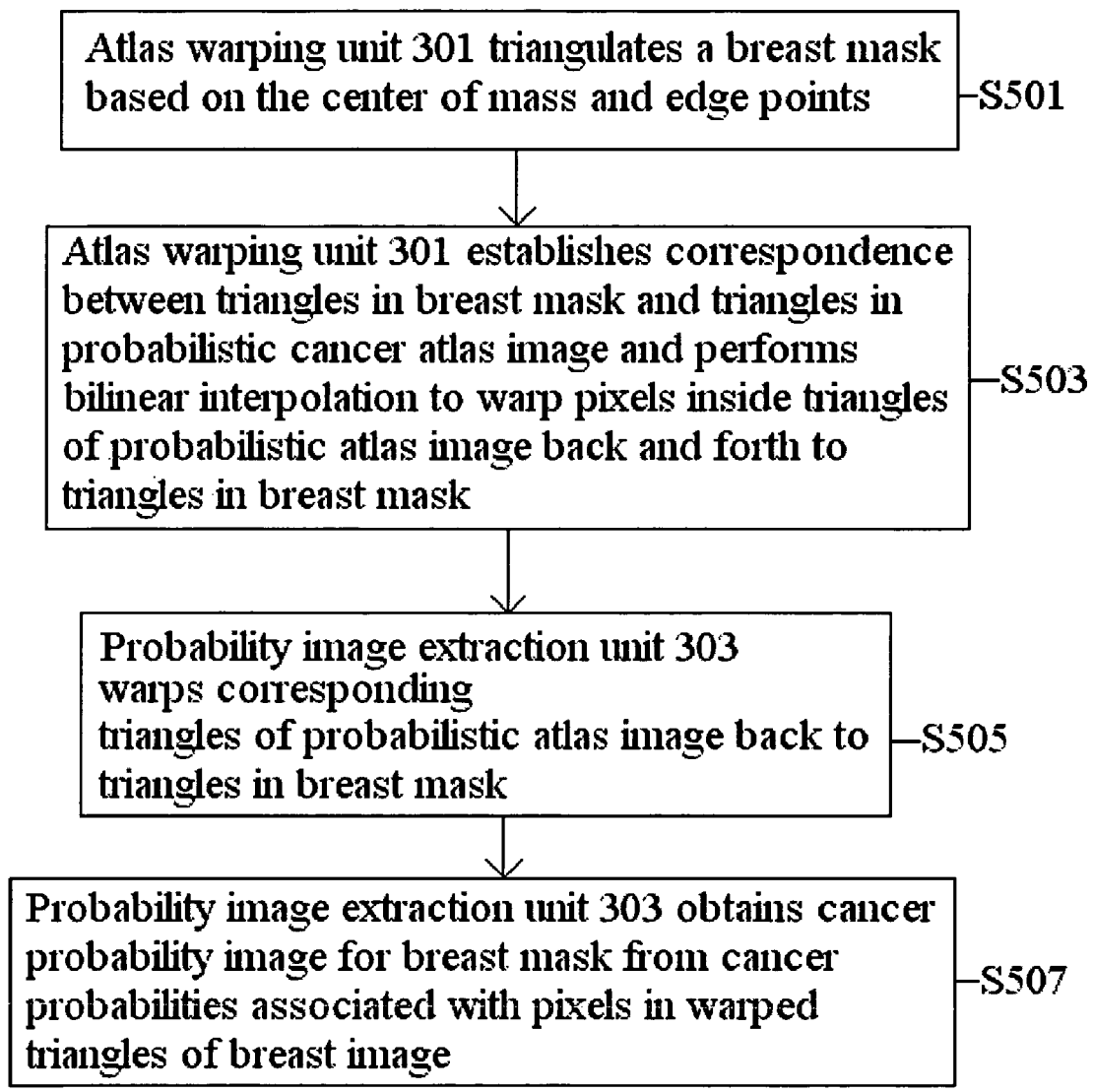
FIG. 7 is a flow diagram illustrating exemplary operations performed by a cancer detection unit included in an image processing unit for cancer detection using a probabilistic atlas according to an embodiment of the present invention illustrated in FIG. 4.

FIG. 7 is a flow diagram illustrating exemplary operations performed by a cancer detection unit 145A included in an image processing unit 35A for cancer detection using a probabilistic atlas according to an embodiment of the present invention illustrated in FIG. 4. FIG. 7 illustrates exemplary operations that may be performed by an atlas warping unit 301 and a probability image extraction unit 303 included in a cancer detection unit 145A.

Atlas warping unit 301 warps the registered shape for breast mask image $B_{mask\_new}$ to a probabilistic cancer atlas $A_{vi}$ for the view $v_i$ of the breast mask image $B_{mask\_new}$. Warping to probabilistic cancer atlas $A_{vi}$ may be performed by triangulating the breast mask $B_{mask\_new}$ using its center of mass and its edge points (S501). After shape registration has been performed by shape registration unit 135A, each triangle in the breast mask $B_{mask\_new}$ corresponds to a triangle in the probabilistic cancer atlas $A_{vi}$ (S503). Since the probabilistic cancer atlas $A_{vi}$ has the shape of the baseline breast atlas shape $B_{a\_vi}$, each triangle in the breast mask $B_{mask\_new}$ also corresponds to a triangle in the baseline breast atlas shape $B_{a\_vi}$. The pixels inside corresponding triangles of the atlas $A_{vi}$ (or $B_{a\_vi}$) can be warped back and forth to triangles in breast mask $B_{mask\_new}$, using a bilinear interpolation (S503). For a correspondence between two triangles, bilinear interpolation in 2D is performed by multiplying each of the vertices by appropriate relative weights, as further described in FIG. 8J.

Probability image extraction unit 303 warps back corresponding triangles of the atlas $A_{vi}$ (or $B_{a\_vi}$), to triangles in breast mask $B_{mask\_new}$ (S505). Cancer probabilities associated with pixels in triangles of the atlas image $A_{vi}$ (or $B_{a\_vi}$) hence become associated with pixels in triangles of breast mask $B_{mask\_new}$ (S507), and a cancer probability image for the breast mask $B_{mask\_new}$ is obtained (S507). The cancer probability image for the breast mask $B_{mask\_new}$ illustrates likely and unlikely locations for cancer in the breast mask $B_{mask\_new}$ and hence in the original breast image associated with the breast mask $B_{mask\_new}$.

Figure 8A:
FIG. 8A illustrates an exemplary baseline breast atlas shape for the ML view for a shape model stored in a probabilistic atlas reference unit.

FIG. 8A illustrates an exemplary baseline breast atlas shape for the ML view for a shape model stored in the probabilistic atlas reference unit 155. The baseline breast atlas shape in FIG. 8A represents the set of pixels that have a 95% or more chance of appearing in a breast mask image in the ML view. The baseline breast atlas shape shown in FIG. 8A may be obtained using techniques described in the co-pending non-provisional application titled "Method and Apparatus for Probabilistic Atlas Based on Shape Modeling Technique", the entire contents of which are hereby incorporated by reference.

Figure 8B:
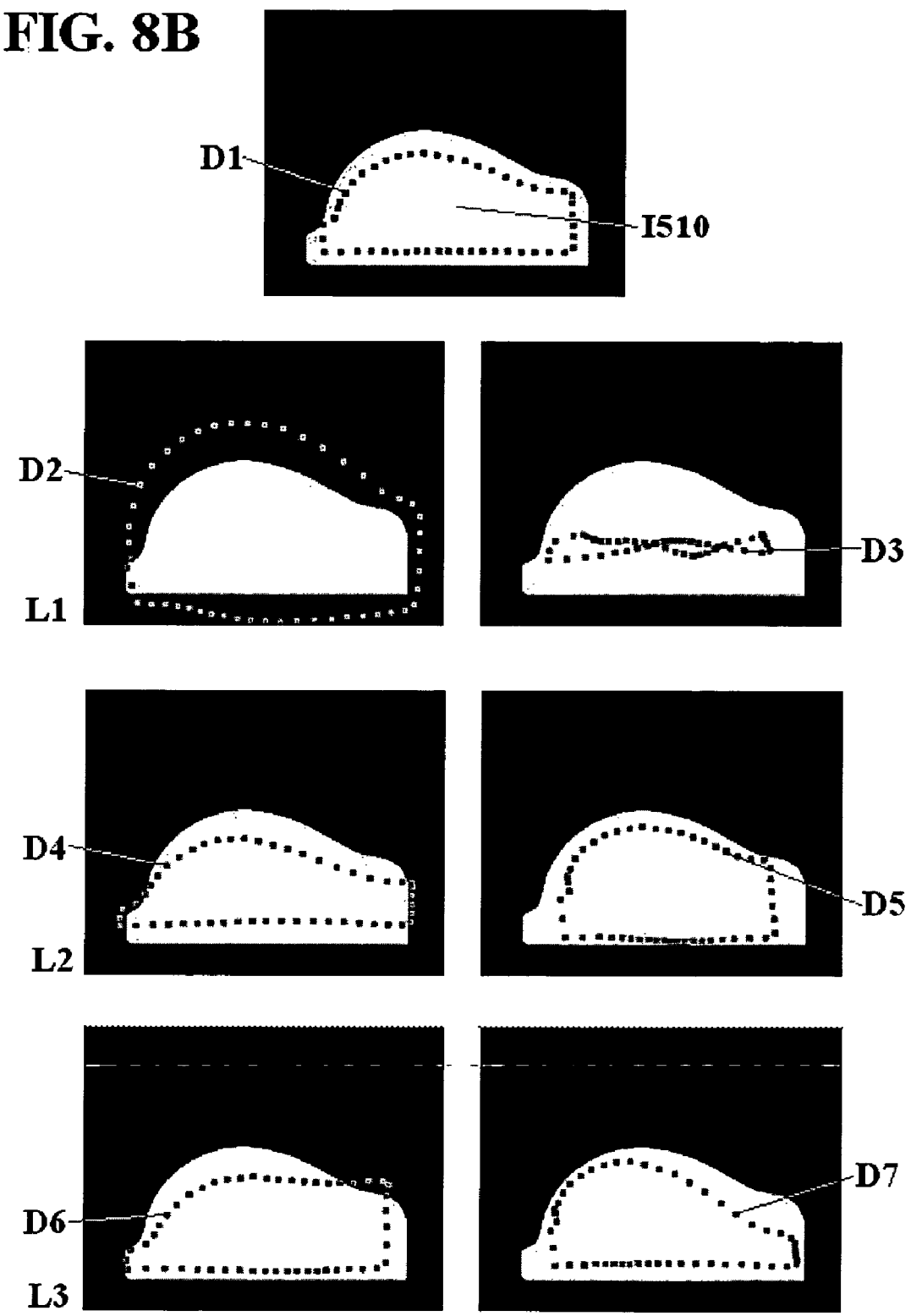
FIG. 8B illustrates exemplary deformation modes for a shape model stored in a probabilistic atlas reference unit.

FIG. 8B illustrates exemplary deformation modes for a shape model stored in the probabilistic atlas reference unit 155. The breast shape in figure I510 is an exemplary baseline breast atlas shape (mean shape) for the ML view.

The first 3 modes (L1, L2, L3) of deformation are shown. The first mode of deformation is L1. Contours D2 and D3 define the deformation mode L1. The deformation mode L1 can be represented by directions and proportional length of movement for each contour point from the D2 contour to a corresponding contour point from the D3 contour. Contours D4 and D5 define the second deformation mode L2, and contours D6 and D7 define the third deformation mode L3.

The deformation modes shown in FIG. 8B may be obtained by training, using techniques described in the co-pending non-provisional application titled "Method and Apparatus for Probabilistic Atlas Based on Shape Modeling Technique", the entire contents of which are hereby incorporated by reference.

Figure 8C:
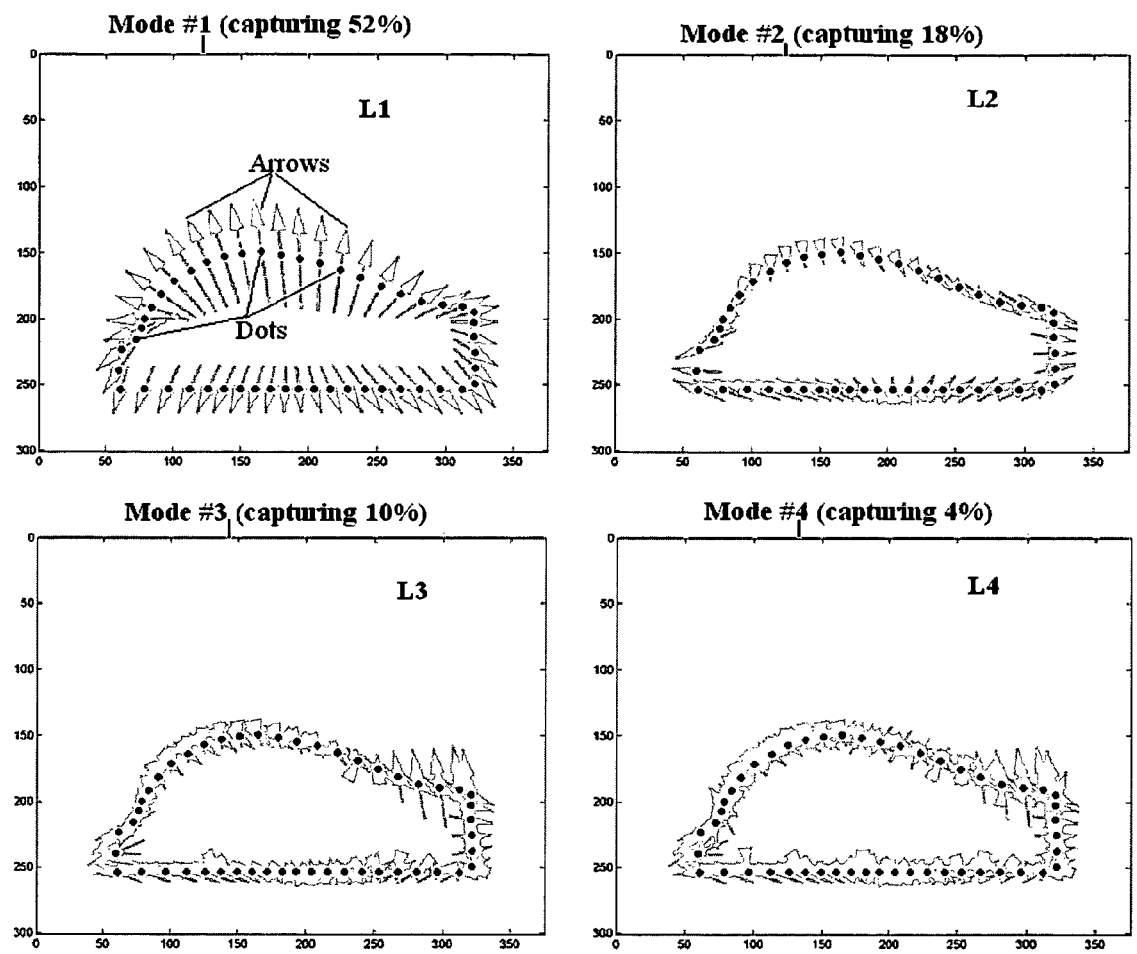
FIG. 8C illustrates another set of exemplary deformation modes for a shape model stored in a probabilistic atlas reference unit.

FIG. 8C illustrates another set of exemplary deformation modes for a shape model stored in the probabilistic atlas reference unit 155. The deformation modes shown in FIG. 8C were obtained by training a shape model using 4900 training breast images of ML view, using techniques described in the co-pending non-provisional application titled "Method and Apparatus for Probabilistic Atlas Based on Shape Modeling Technique", the entire contents of which are hereby incorporated by reference. 17 deformation modes, capturing 99% of the variance in the breast images data set, were obtained. The representations of the first 4 modes L1, L2, L3 and L4 are shown in FIG. 8C. The representations of the first 4 modes L1, L2, L3 and L4 shown in FIG. 8C together capture 85% of the data's variance. For each mode shown in FIG. 8C, the mean breast shape (baseline breast atlas shape) for the ML view is plotted with dots (points), while the arrows represent the distance traveled by one point for that mode from −2 standard deviations to +2 standard deviations of the mean breast shape. Mode L1 captures 52% of the variance in the breast images data set, mode L2 captures 18% of the variance in the breast images data set, mode L3 captures 10% of the variance in the breast images data set, and mode L4 captures 4% of the variance in the breast images data set. The rest of the deformation modes (L5 to L17) are not shown.

Figure 8D:
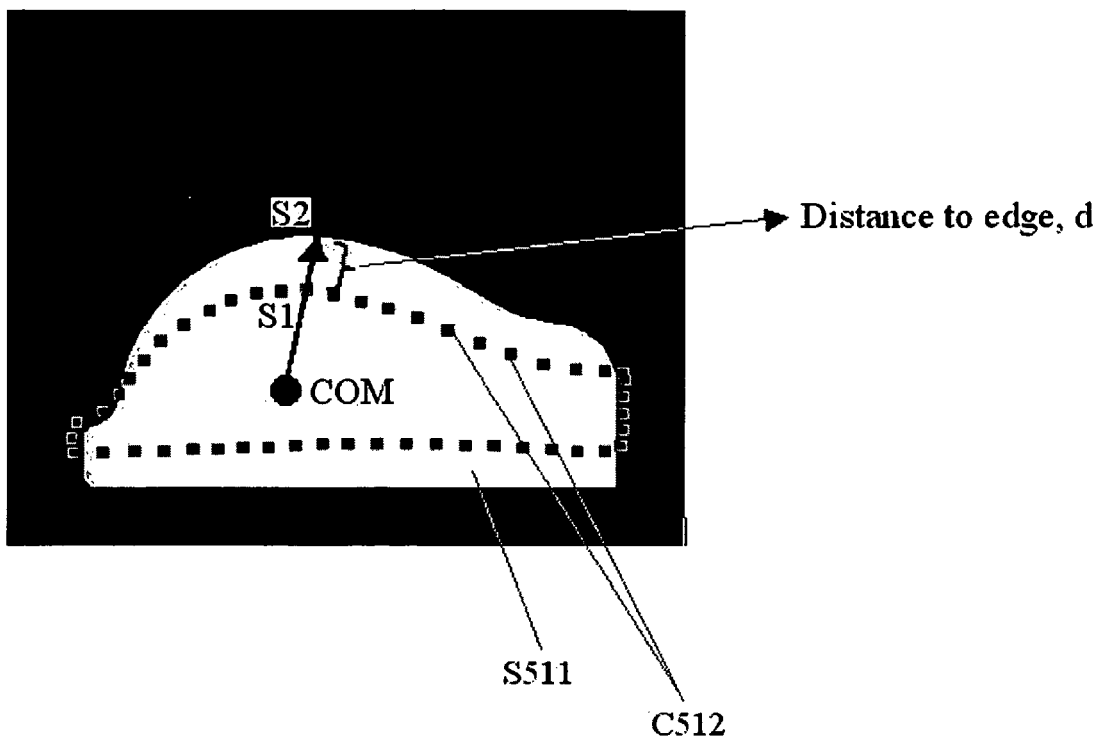
FIG. 8D illustrates exemplary aspects of the operation of calculating a cost function by a shape registration unit for a registered shape according to an embodiment of the present invention illustrated in FIG. 6.

FIG. 8D illustrates exemplary aspects of the operation of calculating a cost function by a shape registration unit 135A for a registered shape according to an embodiment of the present invention illustrated in FIG. 6. Shape registration is performed for the breast mask $B_{mask\_new}$ S511 using an $\alpha_i$, i=1 . . . k parameter set and a 2D offset p. A shape bounded by contour C512 is obtained from formula $$\text{Shape} = B_{a\_vi} + p + \sum_{i=1}^{k_{vi}} \alpha_i L_i,$$

where $B_{a\_vi}$ is a mean breast shape for view $v_i$ of the breast mask $B_{mask\_new}$, and $L_i$, i=1 . . . $k_{vi}$ are shape model deformation modes. The center of mass COM for the Shape bounded by contour C512 is found. For a point S1 on the contour (exterior) of Shape, a line is drawn through the COM point. The line intersects the contour (perimeter) of breast mask $B_{mask\_new}$ S511 at point S2. The distance to edge is the distance d between points S1 and S2. Distances d are obtained for all points on the contour (exterior) C512 of Shape, and a cost function is obtained as the mean of all distances d.

Figure 8E:
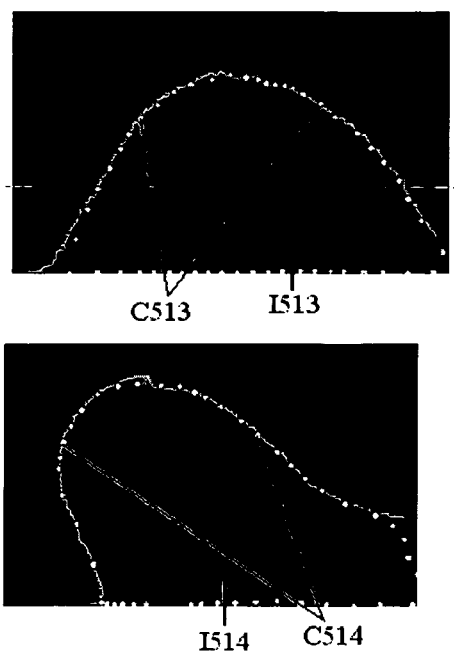
FIG. 8E illustrates exemplary results of the operation of performing shape registration for breast masks by a shape registration unit according to an embodiment of the present invention illustrated in FIG. 6.

FIG. 8E illustrates exemplary results of the operation of performing shape registration for breast masks by a shape registration unit 135A according to an embodiment of the present invention illustrated in FIG. 6. As shown in FIG. 8E, breast masks I513 and I514 are fit with shape representations. The shape registration results bounded by contours C513 and C514 are effectively describing the shapes of breast masks I513 and I514. The downhill simplex algorithm was used by shape registration unit 135A to obtain the shape registration results shown in FIG. 8E.

Figure 8F:
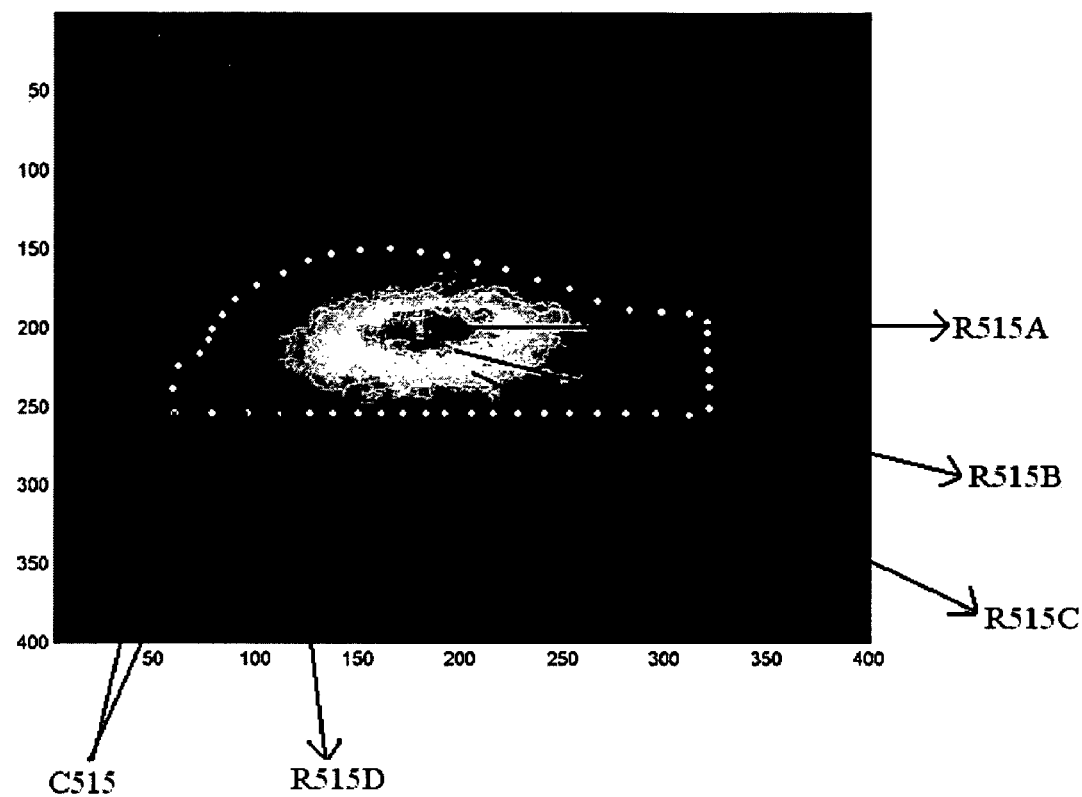
FIG. 8F illustrates an exemplary ML view probabilistic atlas for probability of cancer in breasts stored in a probabilistic atlas reference unit.

FIG. 8F illustrates an exemplary ML view probabilistic atlas for probability of cancer in breasts stored in the probabilistic atlas reference unit 155. For the ML view probabilistic atlas in FIG. 8F, the contour C515 is the contour of the mean breast shape (baseline breast atlas shape) $B_{a\_ML}$ for the ML view. The region R515A indicates the highest probability of cancer, followed by regions R515B, then R515C, and R515D. As shown in the probabilistic atlas, the probability for cancer is largest in the center of a breast, and decreases towards edges of the mean breast shape.

Figure 8G:
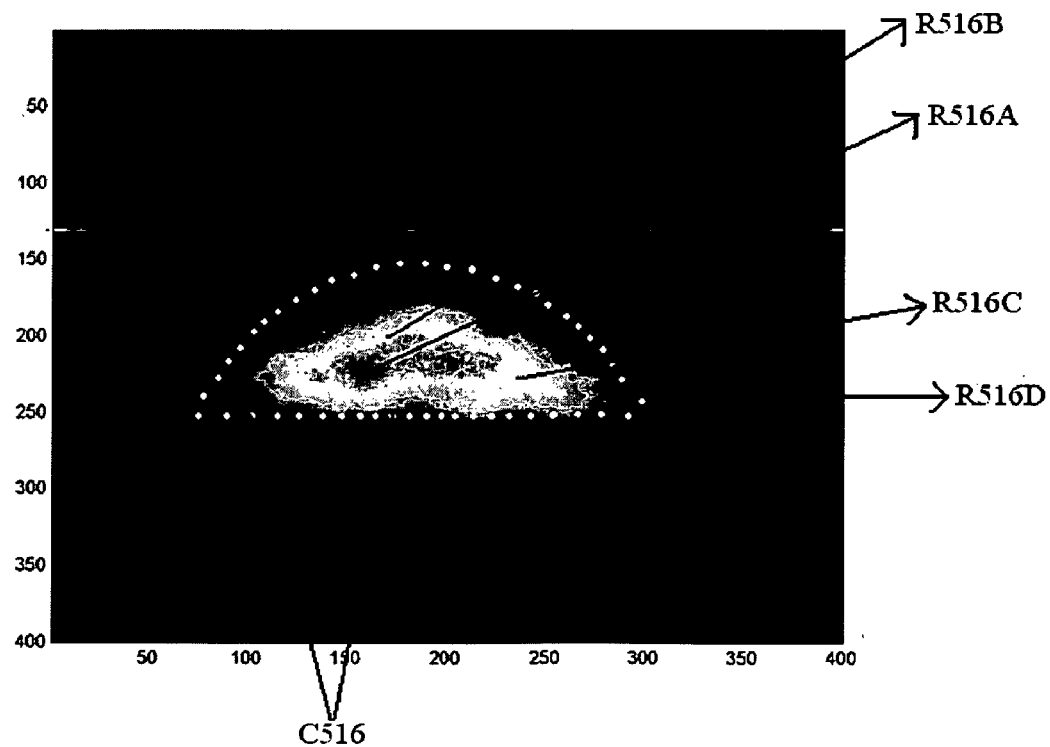
FIG. 8G illustrates an exemplary CC view probabilistic atlas for probability of cancer in breasts stored in a probabilistic atlas reference unit.

FIG. 8G illustrates an exemplary CC view probabilistic atlas for probability of cancer in breasts stored in the probabilistic atlas reference unit 155. For the CC view probabilistic atlas in FIG. 8G, the contour C516 is the contour of the mean breast shape for the CC view. The region R516A indicates the highest probability of cancer, followed by regions R516B, then R516C, and R516D. As shown in the probabilistic atlas, the probability for cancer is largest in the center left region of a breast, and decreases towards edges of the mean breast shape.

Figure 8H:
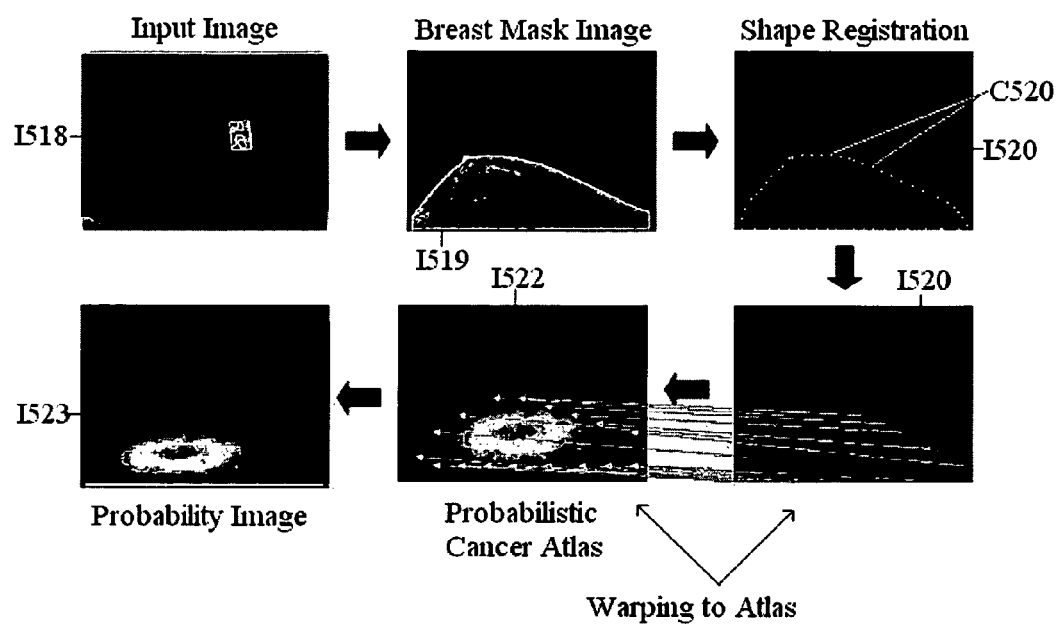
FIG. 8H illustrates exemplary aspects of the operation of generating a cancer probability image for a breast image by an image processing unit for cancer detection using a probabilistic atlas according to an embodiment of the present invention illustrated in FIG. 4.

FIG. 8H illustrates exemplary aspects of the operation of generating a cancer probability image for a breast image by an image processing unit 35A for cancer detection using a probabilistic atlas according to an embodiment of the present invention illustrated in FIG. 4. As illustrated in FIG. 8H, a breast image I518 is input by image operations unit 125A. Image operations unit 125A extracts a breast mask image I519 for the breast image I518. Shape registration unit 135A performs shape registration for the breast mask image, by representing the shape of the breast mask using a shape model. The shape representation contour C520 fits the shape of the breast mask from image I519. Atlas warping unit 301 warps the breast mask registered shape I520 to a probabilistic cancer atlas I522 by generating a correspondence between pixels of the breast mask registered shape I520 and pixels of the probabilistic atlas I522. Using the correspondence, probability image extraction unit 303 warps the probabilistic cancer atlas I522 onto the breast mask registered shape I520, hence obtaining a cancer probability image I523 for the breast image I518.

Figure 8I:
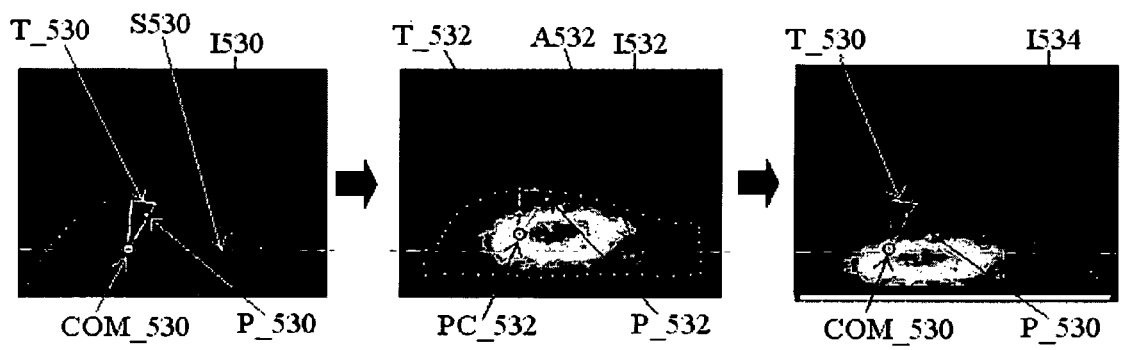
FIG. 8I illustrates exemplary aspects of the operation of warping a breast mask to an atlas using triangulation by a cancer detection unit according to an embodiment of the present invention illustrated in FIG. 7.

FIG. 8I illustrates exemplary aspects of the operation of warping a breast mask to an atlas using triangulation by a cancer detection unit 145A according to an embodiment of the present invention illustrated in FIG. 7.

Atlas warping unit 301 warps a registered shape S530 for a breast mask image $B_{mask\_new}$ I530 to a probabilistic cancer atlas $A_{vi}$ A532 shown in image I532. Warping to probabilistic cancer atlas $A_{vi}$ A532 is performed by triangulating the breast mask shape S530 based on its center of mass COM_530 and edge points. A test point P_530 is used to generate each triangle in the breast mask shape S530. For example, a triangle T_530 is generated using the center of mass COM_530 and the test point P_530 and touching the edges of mask shape S530. The triangle is warped to probabilistic cancer atlas $A_{vi}$ A532 onto a corresponding triangle T_532, with the COM_530 and the test point P_530 mapped to corresponding points PC_532 and P_532. The probabilistic cancer atlas $A_{vi}$ A532 is then warped onto registered shape S530 by warping each triangle T_532 back onto the corresponding triangle T_530 of the breast mask $B_{mask\_new}$ I530. The cancer probability values associated with each pixel in the probabilistic cancer atlas $A_{vi}$ A532 are also warped onto registered shape S530, and a probability image I534 is obtained. The probability image I534 contains probability for cancer at pixels in breast mask image $B_{mask\_new}$ I530.

Figure 8J:
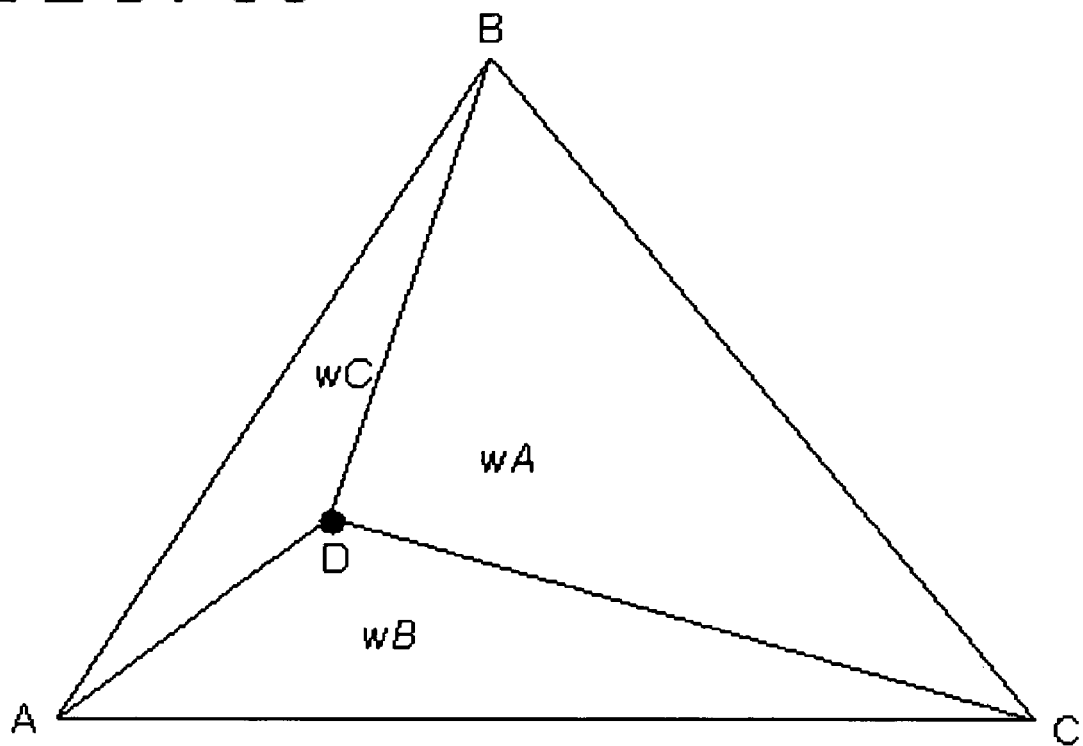
FIG. 8J illustrates exemplary aspects of the operation of bilinear interpolation according to an embodiment of the present invention illustrated in FIG. 7.

FIG. 8J illustrates exemplary aspects of the operation of bilinear interpolation according to an embodiment of the present invention illustrated in FIG. 7. The pixels inside corresponding triangles of the atlas $A_{vi}$ (or $B_{a\_vi}$) can be warped back and forth to triangles in breast mask $B_{mask\_new}$ using a bilinear interpolation, as described at FIG. 7. For a correspondence between two triangles, bilinear interpolation in 2D is performed by multiplying each of the vertices by appropriate relative weights as described in FIG. 8J. Given a triangle with vertices A, B, and C, the pixel intensity at point D can be obtained as:

$$D = A^*wA/T_{abc} + B^*wB/T_{abc} + C^*wC/T_{abc} \tag{2}$$

where A, B, and C are pixel intensities at triangle vertices, $T_{abc}$ is the area of triangle ABC, wA is the area of triangle BCD, wB is the area of triangle ACD, and wC is the area of triangle ABD, so that $T_{abc}$=wA+wB+wC. Hence, given pixels A, B, and C of a triangle inside atlas $A_{vi}$ (or inside $B_{a\_vi}$), and corresponding pixels A', B', and C' of a corresponding triangle in breast mask $B_{mask\_new}$, a pixel D inside triangle ABC can be warped to a pixel D' inside triangle A'B'C', using equation (2) in triangle A'B'C'.

Figure 9:
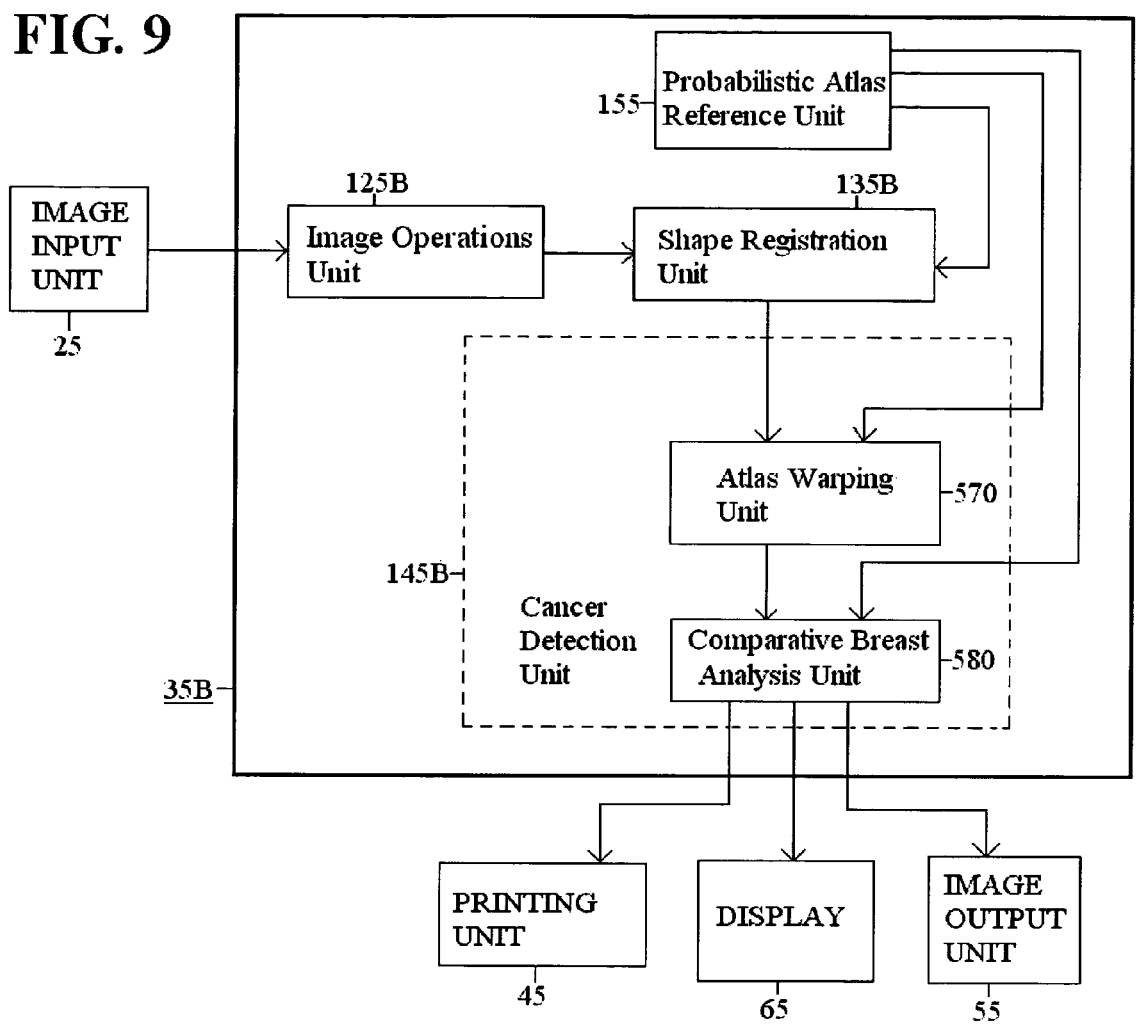
FIG. 9 is a block diagram of an image processing unit for cancer detection using comparative breast analysis according to a second embodiment of the present invention illustrated in FIG. 2.

FIG. 9 is a block diagram of an image processing unit 35B for cancer detection using comparative breast analysis according to a second embodiment of the present invention illustrated in FIG. 2. As shown in FIG. 9, the image processing unit 35B according to this embodiment includes: an image operations unit 125B; a shape registration unit 135B; an atlas warping unit 570; a comparative breast analysis unit 580; and a probabilistic atlas reference unit 155. The atlas warping unit 570 and the comparative breast analysis unit 580 are included in a cancer detection unit 145B.

Image operations unit 125B receives a set of breast images from image input unit 25, and may perform preprocessing and preparation operations on the breast images. Preprocessing and preparation operations performed by image operations unit 125B may include resizing, cropping, compression, color correction, etc., that change size and/or appearance of breast images. Image operations unit 125B creates breast mask images. Breast mask images may be created, for example, by detecting breast borders or breast clusters for the breasts shown in the breast images. Image operations unit 125B may also store/extract information about breast images, such as view of mammograms.

Image operations unit 125B may perform preprocessing and breast mask extraction operations in a similar manner to image operations unit 125A described in FIG. 5. Image operations unit 125B may create breast mask images by detecting breast borders using methods described in the US patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference.

Image operations unit 125B sends the breast mask images to shape registration unit 135B, which performs shape registration for breast mask images. For shape registration, shape registration unit 135B describes breast mask images using a shape model, to obtain registered breast shapes. Shape registration unit 135B retrieves information about the shape model from probabilistic atlas reference unit 155, which stores parameters that define the shape model.

The shape model, together with a probabilistic cancer atlas stored in the probabilistic atlas reference unit 155, have been described at FIG. 4, and can be generated off-line, using training breast images. Details on generation of a breast shape model and a probabilistic cancer atlas using sets of training breast images can be found in the co-pending non-provisional application titled "Method and Apparatus for Probabilistic Atlas Based on Shape Modeling Technique", the entire contents of which are hereby incorporated by reference. Probabilistic atlas reference unit 155 stores information for shape models for breasts, for various views.

Shape registration unit 135B may perform shape registration in a manner similar to shape registration unit 135A, as described at FIG. 6. As described at FIG. 4, a shape model for a given mammogram view includes a baseline breast atlas shape and a set of deformation modes. Atlas warping unit 570 receives the registration results for the breast mask images from shape registration unit 135B, and warps the breast mask images to probabilistic cancer atlases associated with the views of the breast mask images. Atlas warping unit 570 may also warp breast mask images to baseline breast atlas shapes specific to the views of the breast mask images. Atlas warping unit 570 may perform warping of breast mask images to baseline breast atlas shapes or to probabilistic cancer atlases in a manner similar to atlas warping unit 301, using techniques described at FIG. 4 and at FIG. 7.

Comparative breast analysis unit 580 receives warped breast mask images from atlas warping unit 570 and performs a comparative analysis between warped breast mask images.

One technique by which cancer can be found in breasts is by searching for anomalies present in a left breast image from a person, that do not appear in the right breast image of that person, or vice versa. Suppose a left breast image $I_L$ and a right breast image $I_R$ obtained from a mammography machine are compared manually or by a computer. Because the left and the right breast shapes often do not coincide, it is unclear which pixels in the left breast image $I_L$ and which pixels in the right breast image $I_R$ should be compared and subtracted, in order to obtain a difference image that would expose breast anomalies.

Using the image processing unit 35B it is possible to establish a one-to-one correspondence between pixels in a left breast image and a right breast image. For a left breast image $I_L$ and a right breast image $I_R$ with the same mammogram view v and obtained from the same person, image operations unit 125A obtains a left breast mask image $B_{L\_mask}$ and a right breast mask image $B_{R\_mask}$. Shape registration unit 135B performs shape registration for left breast mask image $B_{L\_mask}$ and right breast mask image $B_{R\_mask}$ using the shape model for view v.

Atlas warping unit 570 receives the registration results for the left breast mask image $B_{L\_mask}$ and the right breast mask image $B_{R\_mask}$. Atlas warping unit 570 uses the shape registration results and warps the left breast mask image $B_{L\_mask}$ and the right breast mask image $B_{R\_mask}$ into the atlas space. Atlas warping unit 570 warps the left breast mask image $B_{L\_mask}$ and the right breast mask image $B_{R\_mask}$ to the baseline breast atlas shape $B_{a\_v}$ associated with the view v, or to the probabilistic cancer atlas $A_v$ associated with view v. Two warped images in the atlas space, $B_{L\_mask\_warped}$ for the left breast and $B_{R\_mask\_warped}$ for the right breast are obtained. The warped images $B_{L\_mask\_warped}$ for the left breast and $B_{R\_mask\_warped}$ for the right breast in the atlas space have the shape of baseline breast atlas shape $B_{a\_v}$, hence a one-to-one correspondence exists between pixels of warped images $B_{L\_mask\_warped}$ and $B_{R\_mask\_warped}$.

A typical mass lesion/anomaly/cancer structure will appear as a cluster of high intensity pixels (appearing as a bright splotch) on a mammogram.

Comparative breast analysis unit 580 receives the warped images $B_{L\_mask\_warped}$ and $B_{R\_mask\_warped}$ and subtracts them by, for example, subtracting corresponding pixel intensities. A subtraction image is obtained. Anomalies present in only one breast will appear in the subtraction image. Hence, cancer structures/mass lesions present in one breast, and which have no equivalent structures in the other breast, will be visible in the subtraction image.

The left breast mask image $B_{L\_mask}$ and the right breast mask image $B_{R\_mask}$ may be warped either to the baseline breast atlas shape $B_{a\_v}$ (such as, for example, a mean breast shape) associated with the view v, or to the probabilistic cancer atlas $A_v$ associated with view v. If the left breast mask image and the right breast mask image are warped to the probabilistic cancer atlas $A_v$, the space searched for anomalies can be limited. In particular, the search space can be limited by performing image subtraction only for areas with a high prior likelihood of cancer, as indicated by the probabilistic cancer atlas.

Comparative breast analysis unit 580 may also compare and subtract warped images of the same breast, taken at different times. For example, a warped image obtained from a mammogram taken a year ago, can be compared and subtracted from a warped image obtained from a mammogram taken 5 years ago, to observe structural changes that have occurred in the breast.

Image processing unit 35B hence provides a technique of warping different breast shapes into the same space and performing comparative analysis on the breast shapes in a common atlas space.

Image operations unit 125B, shape registration unit 135B, atlas warping unit 570, comparative breast analysis unit 580, and probabilistic atlas reference unit 155 are software systems/applications. Image operations unit 125B, shape registration unit 135B, atlas warping unit 570, comparative breast analysis unit 580, and probabilistic atlas reference unit 155 may also be purpose built hardware such as FPGA, ASIC, etc.

Figure 10A:
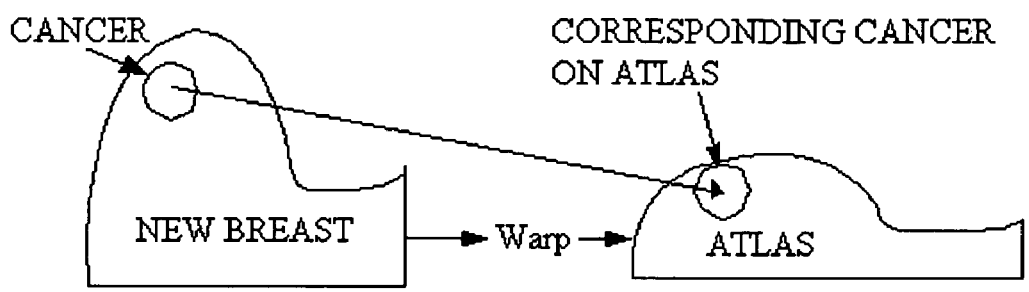
FIG. 10A illustrates aspects of the operation of warping a cancer formation to an atlas for comparative breast analysis according to a second embodiment of the present invention illustrated in FIG. 9.

FIG. 10A illustrates aspects of the operation of warping a cancer formation to an atlas for comparative breast analysis according to a second embodiment of the present invention illustrated in FIG. 9. A new breast image is warped onto a baseline breast atlas shape. A cancer formation located in the new breast image will also be warped onto the baseline breast atlas shape, indicating where on the baseline breast atlas shape the corresponding cancer formation is located.

Figure 10B:
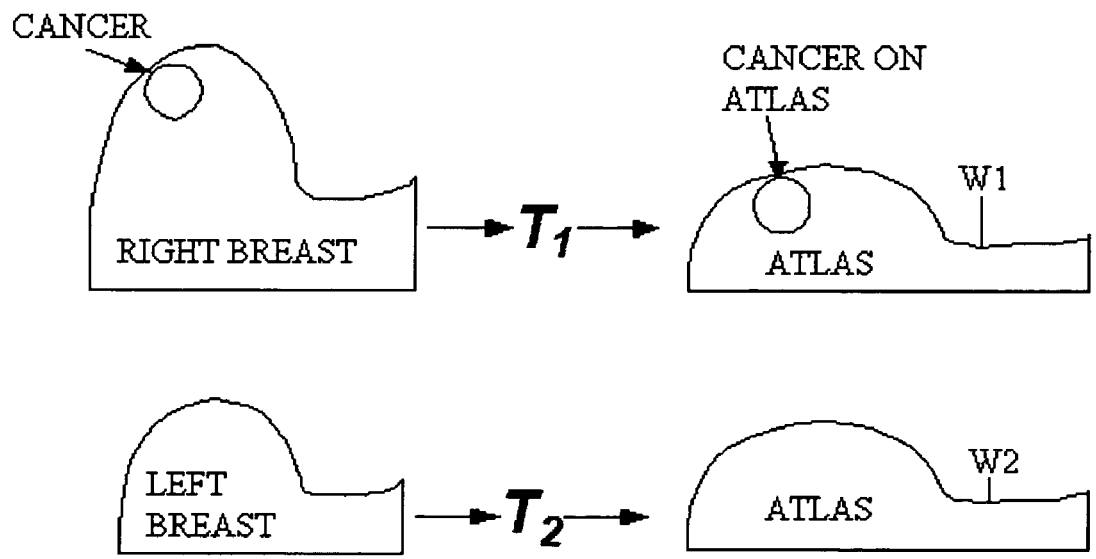
FIG. 10B illustrates aspects of the operation of cancer detection using comparative breast analysis according to a second embodiment of the present invention illustrated in FIG. 9.

FIG. 10B illustrates aspects of the operation of cancer detection using comparative breast analysis according to a second embodiment of the present invention illustrated in FIG. 9. As shown in FIG. 10B, the right breast view of a person has a cancer formation, while the left breast view of the same person does not have cancer. The shapes of the right and left breast are different. The difference in breast shapes could be due to anatomical variability, and also to the presence of the cancer in the right breast, which increases the size of the right breast.

Both right and left breasts are warped onto the baseline breast atlas shape, using transformations T1 and T2. Even though the left and right breasts are different view mammograms, they are a pair of mirror images. For example, the MLL view is the mirror image of the MLR view about the vertical axis; hence one baseline breast atlas shape can be used for both MLL and MLR view mammograms. Similarly, the CCL view is the mirror image of the CCR view about the vertical axis; hence one baseline breast atlas shape can be used for both CCL and CCR view mammograms. In other words, the baseline breast atlas shapes for mirror images, such as MLL and MLR, are the same. By comparing the baseline breast atlas shapes W1 and W2 obtained by warping the right and left breasts, the cancer formation is detected, as it is present inside baseline breast atlas shape W1 but not inside identical baseline breast atlas shape W2. When W2 is subtracted from W1 in the baseline breast atlas space, the cancer formation is obtained.

Figure 11:
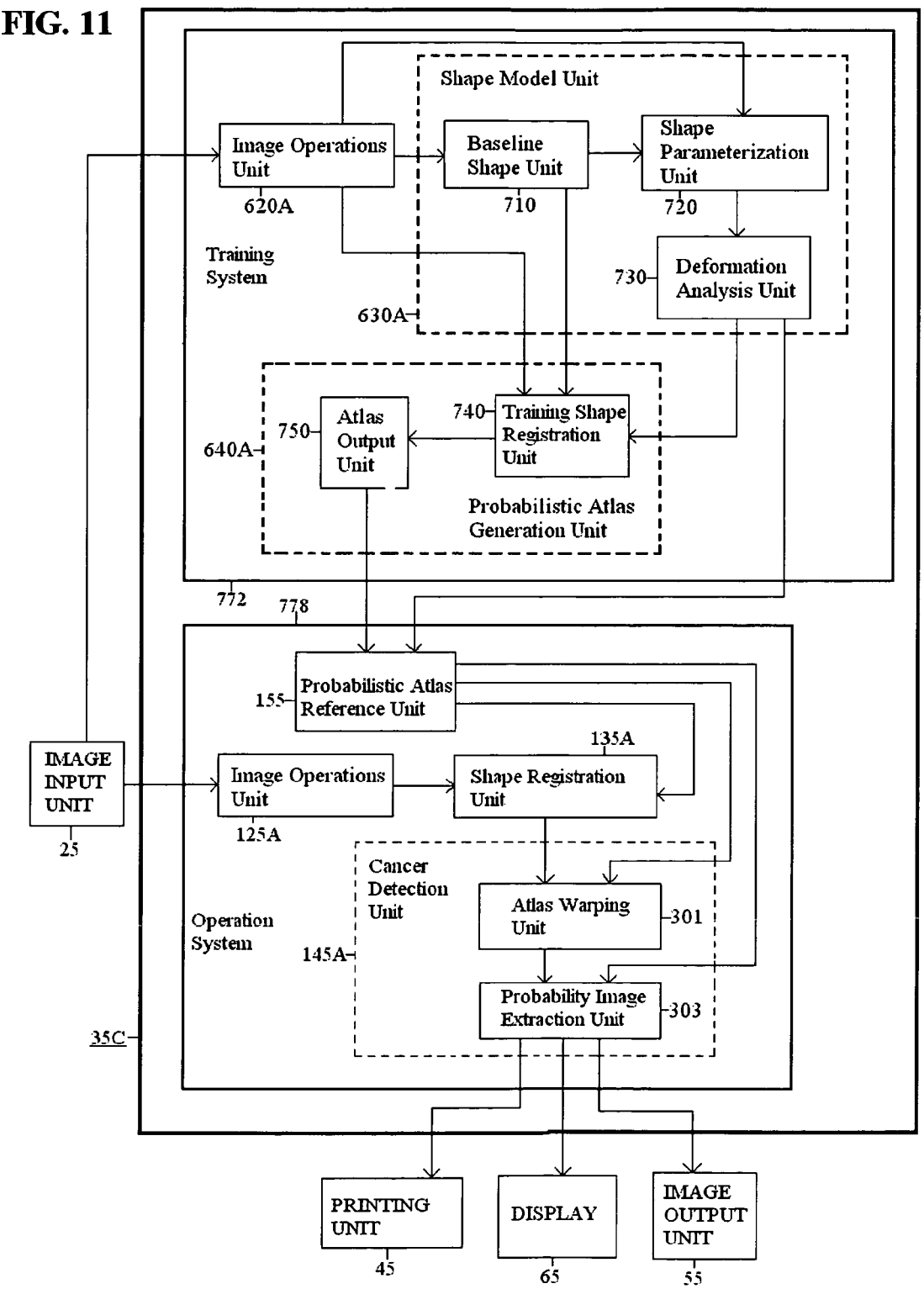
FIG. 11 is a block diagram of an image processing unit for cancer detection using a probabilistic atlas to obtain a cancer probability image according to a third embodiment of the present invention illustrated in FIG. 2.

FIG. 11 is a block diagram of an image processing unit 35C for cancer detection using a probabilistic atlas to obtain a cancer probability image according to a third embodiment of the present invention illustrated in FIG. 2. As shown in FIG. 11, the image processing unit 35C includes the following components: an image operations unit 620A; a baseline shape unit 710; a shape parameterization unit 720; a deformation analysis unit 730; a training shape registration unit 740; an atlas output unit 750; an image operations unit 125A; a shape registration unit 135A; an atlas warping unit 301; a probability image extraction unit 303; and a probabilistic atlas reference unit 155. Image operations unit 620A, baseline shape unit 710, shape parameterization unit 720, deformation analysis unit 730, training shape registration unit 740, and atlas output unit 750 are included in a training system 772. Image operations unit 125A, shape registration unit 135A, atlas warping unit 301, probability image extraction unit 303, and probabilistic atlas reference unit 155 are included in an operation system 778.

Operation of the image processing unit 35C can generally be divided into two stages: (1) training; and (2) operation for breast cancer probability estimation.

The principles involved in the training stage have been described in the co-pending non-provisional application titled "Method and Apparatus for Probabilistic Atlas Based on Shape Modeling Technique", the entire contents of which are hereby incorporated by reference. In accordance with this third embodiment illustrated in FIG. 11, the image operations unit 620A, baseline shape unit 710, shape parameterization unit 720, deformation analysis unit 730, training shape registration unit 740, and atlas output unit 750 train to generate a shape model and a probabilistic cancer atlas for breast shapes. The knowledge accumulated through training by training system 772 is sent to probabilistic atlas reference unit 155.

In accordance with this third embodiment of the present invention, the image operations unit 125A, the shape registration unit 135A, the atlas warping unit 301, the probability image extraction unit 303, and the probabilistic atlas reference unit 155 may function in like manner to the corresponding elements of the first embodiment illustrated in FIG. 4. During regular operation of image processing unit 35C, probabilistic atlas reference unit 155 provides reference data training knowledge to shape registration unit 135A, atlas warping unit 301 and probability image extraction unit 303, for extracting an information about cancer probability in new breast images. The principles involved in the operation for breast cancer probability extraction for new breast images have been described in FIGS. 4, 5, 6, 7, and 8.

During the training stage, image operations unit 620A receives a set of training breast images from image input unit 25, performs preprocessing and preparation operations on the breast images, creates training breast mask images, and stores/extracts information about breast images, such as view of mammograms. Additional details regarding operation of image operations unit 620A are described in the co-pending non-provisional application titled "Method and Apparatus for Probabilistic Atlas Based on Shape Modeling Technique", the entire contents of which are hereby incorporated by reference. Image operations unit 620A may create breast mask images by extracting breast borders using methods described in the US patent application titled "Method and Apparatus for Breast Border Detection", application Ser. No. 11/366,495, by Daniel Russakoff and Akira Hasegawa, filed on Mar. 3, 2006, the entire contents of which are hereby incorporated by reference. Other breast border detection techniques can also be used by image operations unit 620A to obtain shape mask images for breast images.

Baseline shape unit 710 receives training breast mask images from image operations unit 620A, and generates a baseline breast atlas shape such as, for example, a mean breast shape, from the training breast mask images. Baseline shape unit 710 may align the centers of mass of the training breast mask images. The alignment of centers of mass of training breast mask images results in a probabilistic map in which the brighter a pixel is, the more likely it is for the pixel to appear in a training breast mask image. A probability threshold may then be applied to the probabilistic map, to obtain a baseline breast atlas shape, such as, for example, a mean breast shape. Additional details regarding operation of baseline shape unit 710 are described in the co-pending non-provisional application titled "Method and Apparatus for Probabilistic Atlas Based on Shape Modeling Technique", the entire contents of which are hereby incorporated by reference.

Shape parameterization unit 720 receives the training breast mask images and the baseline breast atlas shape, and warps the training breast mask images onto the baseline breast atlas shape, to define parameterization of breast shape. Shape parameterization unit 720 may use shape parameterization techniques adapted from "Automatic Generation of Shape Models Using Nonrigid Registration with a Single Segmented Template Mesh" by G. Heitz, T. Rohlfing and C. Maurer, Proceedings of Vision, Modeling and Visualization, 2004, the entire contents of which are hereby incorporated by reference. Control points may be placed along the edges of the baseline breast atlas shape. A deformation grid is generated using the control points. Using the deformation grid, the control points are warped onto training breast mask images. Shape information for training breast mask images is then given by the corresponding warped control points together with centers of mass of the shapes defined by the warped control points. Warping of control points from the baseline breast atlas shape onto training breast mask images may be performed by non-rigid registration, with B-splines transformations used to define warps from baseline breast atlas shape to training breast mask images. Shape parameterization unit 720 may perform non-rigid registration using techniques discussed in "Automatic Construction of 3-D Statistical Deformation Models of the Brain Using Nonrigid Registration", by D. Rueckert, A. Frangi and J. Schnabel, IEEE Transactions on Medical Imaging, 22(8), p. 1014-1025, August 2003, the entire contents of which are hereby incorporated by reference. Shape parameterization unit 720 outputs shape representations for training breast mask images. Additional details regarding operation of shape parameterization unit 720 are described in the co-pending non-provisional application titled "Method and Apparatus for Probabilistic Atlas Based on Shape Modeling Technique", the entire contents of which are hereby incorporated by reference.

Deformation analysis unit 730 uses breast shape parameterization results to learn a shape model that describes how shape varies from breast to breast. Using representations of shape for the training breast mask images, deformation analysis unit 730 finds the principal modes of deformation between the training breast mask images and the baseline breast atlas shape. Deformation analysis unit 730 may use Principal Components Analysis (PCA) techniques to find the principal modes of deformation. The principal components obtained from PCA represent modes of deformation between training breast mask images and the baseline breast atlas shape. Additional details regarding operation of deformation analysis unit 730 are described in the co-pending non-provisional application titled "Method and Apparatus for Probabilistic Atlas Based on Shape Modeling Technique", the entire contents of which are hereby incorporated by reference.

The baseline breast atlas shape and the modes of deformation between training breast mask images and the baseline breast atlas shape, define a shape model. A shape model can be obtained for each mammogram view. Shape model information is sent to probabilistic atlas reference unit 155, to be used during operation of image processing unit 35C.

Training shape registration unit 740 receives data that defines the shape model. Training shape registration unit 740 then fits training breast mask images with their correct shape representations, which are linear combinations of the principal modes of shape variation. Shape registration unit 740 may use the downhill simplex method, also known as the Nelder-Mead or the amoeba algorithm, to optimize parameters of the shape model for each training breast mask image in the training dataset, and optimally describe training breast mask images using the shape model. Additional details regarding operation of training shape registration unit 740 are described in the co-pending non-provisional application titled "Method and Apparatus for Probabilistic Atlas Based on Shape Modeling Technique", the entire contents of which are hereby incorporated by reference.

Atlas output unit 750 receives from training shape registration unit 740 the results of shape registration for the set of training breast mask images analyzed. The set of training breast mask images have cancer formations that have been previously localized. Using shape registration results, the localized cancer formations in the training breast mask images are mapped from the training breast mask images onto the baseline breast atlas shape. An atlas is created with locations of the cancer formations in the baseline breast atlas shape. Since a large number of training breast mask images with previously localized cancer formations are used, the atlas is a probabilistic atlas that gives the probability of cancer formations for each pixel inside the baseline breast atlas shape. One probabilistic cancer atlas may be generated for each mammogram view. The probabilistic cancer atlases for various breast views are sent to probabilistic atlas reference unit 155, to be used during operation of image processing unit 35C. Additional details regarding operation of atlas output unit 750 are described in the co-pending non-provisional application titled "Method and Apparatus for Probabilistic Atlas Based on Shape Modeling Technique", the entire contents of which are hereby incorporated by reference.

Image operations unit 620A, baseline shape unit 710, shape parameterization unit 720, deformation analysis unit 730, training shape registration unit 740, atlas output unit 750, image operations unit 125A, shape registration unit 135A, atlas warping unit 301, probability image extraction unit 303, and a probabilistic atlas reference unit 155 are software systems/applications. Image operations unit 620A, baseline shape unit 710, shape parameterization unit 720, deformation analysis unit 730, training shape registration unit 740, atlas output unit 750, image operations unit 125A, shape registration unit 135A, atlas warping unit 301, probability image extraction unit 303, and a probabilistic atlas reference unit 155 may also be purpose built hardware such as FPGA, ASIC, etc.

Figure 12:
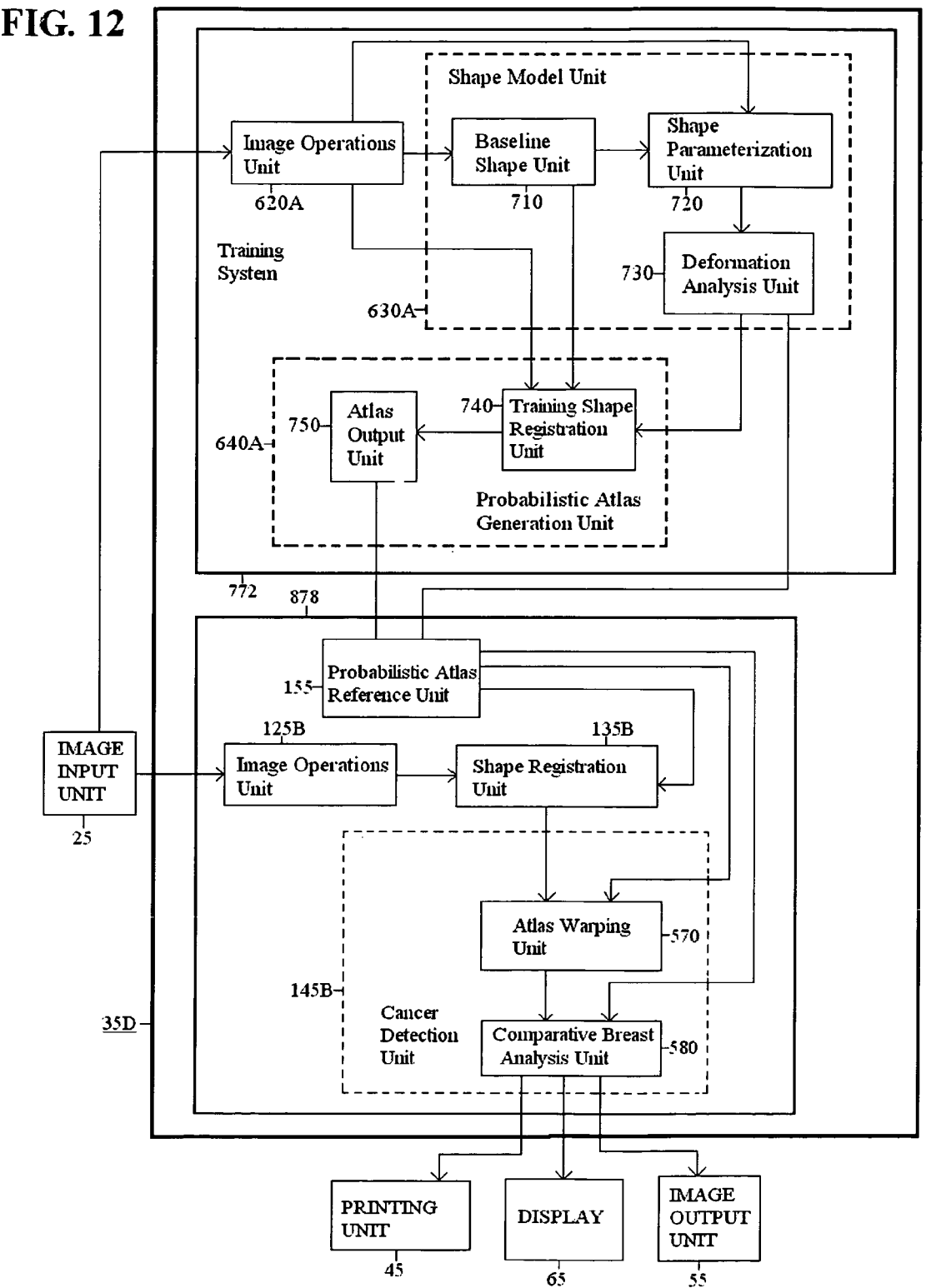
FIG. 12 is a block diagram of an image processing unit for cancer detection using comparative breast analysis according to a fourth embodiment of the present invention illustrated in FIG. 2.

FIG. 12 is a block diagram of an image processing unit 35D for cancer detection using comparative breast analysis according to a fourth embodiment of the present invention illustrated in FIG. 2. As shown in FIG. 12, the image processing unit 35D includes the following components: an image operations unit 620A; a baseline shape unit 710; a shape parameterization unit 720; a deformation analysis unit 730; a training shape registration unit 740; an atlas output unit 750; an image operations unit 125B; a shape registration unit 135B; an atlas warping unit 570; a comparative breast analysis unit 580; and a probabilistic atlas reference unit 155. Image operations unit 620A, baseline shape unit 710, shape parameterization unit 720, deformation analysis unit 730, training shape registration unit 740, and atlas output unit 750 are included in a training system 772. Image operations unit 125B, shape registration unit 135B, atlas warping unit 570, comparative breast analysis unit 580, and probabilistic atlas reference unit 155 are included in an operation system 878.

Operation of the image processing unit 35D can generally be divided into two stages: (1) training; and (2) operation for breast cancer probability estimation.

The principles involved in the training stage have been described in the co-pending non-provisional application titled "Method and Apparatus for Probabilistic Atlas Based on Shape Modeling Technique", the entire contents of which are hereby incorporated by reference. In accordance with this fourth embodiment illustrated in FIG. 12, the image operations unit 620A, baseline shape unit 710, shape parameterization unit 720, deformation analysis unit 730, training shape registration unit 740, and atlas output unit 750 train to generate a shape model and a probabilistic cancer atlas for breast shapes, as was also described at FIG. 11. The knowledge accumulated through training by training system 772 is sent to probabilistic atlas reference unit 155.

In accordance with this fourth embodiment of the present invention, the image operations unit 125B, shape registration unit 135B, atlas warping unit 570, comparative breast analysis unit 580, and probabilistic atlas reference unit 155 may function in like manner to the corresponding elements of the second embodiment illustrated in FIG. 9. During regular operation of image processing unit 35D, probabilistic atlas reference unit 155 provides reference data training knowledge to shape registration unit 135B, atlas warping unit 570 and comparative breast analysis unit 580 for cancer detection using comparative breast analysis of new breast images. The principles involved in the operation for comparative breast analysis for breast cancer detection have been described in FIGS. 9, 5, 6, 8, 10A and 10B.

Image operations unit 620A, baseline shape unit 710, shape parameterization unit 720, deformation analysis unit 730, training shape registration unit 740, atlas output unit 750, image operations unit 125B, shape registration unit 135B, atlas warping unit 570, comparative breast analysis unit 580, and probabilistic atlas reference unit 155 are software systems/applications. Image operations unit 620A, baseline shape unit 710, shape parameterization unit 720, deformation analysis unit 730, training shape registration unit 740, atlas output unit 750, image operations unit 125B, shape registration unit 135B, atlas warping unit 570, comparative breast analysis unit 580, and probabilistic atlas reference unit 155 may also be purpose built hardware such as FPGA, ASIC, etc.

The methods and apparatuses described in the current application enable comparison of high-level shapes of two distinct breasts, for detection of cancer. The methods and apparatuses described in the current application obtain data for probability of cancer in breasts, using a probabilistic atlas with probabilities of cancer in a baseline breast atlas shape. The methods and apparatuses described in the current application are automatic and can be used in computer-aided detection of cancer in breasts. The methods and apparatuses described in the current application can use shape models for other anatomical parts besides breasts, and probabilistic atlases for other anomalous structures besides cancer structures. For example, the methods and apparatuses described in the current application can be used for detection of lung and colon cancer. The methods and apparatuses described in the current application can automatically detect other anomalous structures besides cancer structures, for other anatomical parts besides breasts. The methods and apparatuses described in the current application can use shape models for anatomical parts and probabilistic atlases for anomalous structures, generated using techniques described in the co-pending non-provisional application titled "Method and Apparatus for Probabilistic Atlas Based on Shape Modeling Technique", the entire contents of which are hereby incorporated by reference.

Although detailed embodiments and implementations of the present invention have been described above, it should be apparent that various modifications are possible without departing from the spirit and scope of the present invention.

I claim:

1. A feature detection method, said method comprising:
    accessing digital image data representing an object;
    accessing reference data including
        a shape model relating to shape variation from a baseline object, and
        a probabilistic atlas comprising probability for a feature in said baseline object;
    performing shape registration for said object by representing a shape of said object using said shape model, to obtain a registered shape; and
    determining probability for said feature in said object by generating a correspondence between a geometric element associated with said probabilistic atlas and a geometric element associated with said registered shape.

2. The feature detection method as recited in claim 1, wherein
    said shape model includes deformation modes to describe shape deformation between said shape of said object and said baseline object, and
    said step of performing shape registration fits said shape of said object using combinations of said deformation modes, to obtain said registered shape.

3. The feature detection method as recited in claim 2, wherein said step of performing shape registration fits said shape of said object to linear combinations of said deformation modes, by optimizing linear coefficients for said deformation modes.

4. The feature detection method as recited in claim 3, wherein said step of performing shape registration optimizes said linear coefficients for said deformation modes using a downhill simplex method.

5. The feature detection method as recited in claim 1, wherein said step of determining probability includes
    triangulating said registered shape using center of mass and edge points of said registered shape to obtain a plurality of triangles, and
    generating said correspondence between said plurality of triangles and a plurality of baseline triangles in said baseline object.

6. The feature detection method as recited in claim 1, wherein said step of determining probability includes
    establishing said correspondence between pixels of said baseline object and pixels of said registered shape, and
    mapping said probability for said feature in said baseline object from said probabilistic atlas to pixels of said registered shape, to obtain a probability image for said feature in said object.

7. The feature detection method as recited in claim 1, further comprising:
    obtaining said shape of said object by detecting clusters of pixels belonging to said object.

8. The feature detection method as recited in claim 1, wherein said object is a breast, said feature is a cancer structure, and said probabilistic atlas stores probabilities for said cancer structure in said baseline object.

9. The feature detection method as recited in claim 1, further comprising:
    training using a plurality of training objects including said feature, to generate said baseline object, said shape model, and said probabilistic atlas, said training step including
        generating said baseline object by aligning shapes of said plurality of training objects using centers of mass of said plurality of training objects,
        determining deformation modes to describe shape deformations between said shapes of said plurality of training objects and said baseline object,
        performing training shape registration for said plurality of training objects by fitting said shapes of said plurality of training objects using combinations of said deformation modes, to obtain a plurality of registered training shapes, and
        generating said probabilistic atlas by mapping locations of said feature from said plurality of training objects to said baseline object, using said plurality of registered training shapes.

10. The feature detection method as recited in claim 9, wherein
    said sub-step of generating said baseline object further includes
        obtaining a map of pixel frequencies for said shapes of plurality of training objects, and
        thresholding said map of pixel frequencies at a predetermined frequency to obtain baseline object,
    and said sub-step of determining deformation modes includes placing control points on edges of said baseline object,
generating a deformation grid using said control points,
warping said control points from said baseline object to said shapes of said plurality of training objects using said deformation grid to obtain warped control points,
obtaining shape parameterizations for said shapes of said plurality of training objects using said warped control points, and
extracting said deformation modes using Principal Component Analysis for set of said shape parameterizations, to obtain said deformation modes as principal components.

11. A feature detection apparatus, said apparatus comprising:
an image data input unit for providing digital image data representing an object;
a reference data unit for providing reference data including
a shape model relating to shape variation from a baseline object, and
a probabilistic atlas comprising probability for a feature in said baseline object;
a shape registration unit for performing shape registration for said object by representing a shape of said object using said shape model, to obtain a registered shape; and
a feature analysis unit for determining probability for said feature in said object by generating a correspondence between a geometric element associated with said probabilistic atlas and a geometric element associated with said registered shape.

12. The apparatus according to claim 11, wherein
said shape model includes deformation modes to describe shape deformation between said shape of said object and said baseline object, and
said shape registration unit fits said shape of said object using combinations of said deformation modes, to obtain said registered shape.

13. The apparatus according to claim 12, wherein said shape registration unit fits said shape of said object to linear combinations of said deformation modes, by optimizing linear coefficients for said deformation modes.

14. The apparatus according to claim 13, wherein said shape registration unit optimizes said linear coefficients for said deformation modes using a downhill simplex method.

15. The apparatus according to claim 11, wherein said feature analysis unit determines probability for said feature in said object by
triangulating said registered shape using center of mass and edge points of said registered shape to obtain a plurality of triangles, and
generating said correspondence between said plurality of triangles and a plurality of baseline triangles in said baseline object.

16. The apparatus according to claim 11, wherein said feature analysis unit determines probability for said feature in said object by
establishing said correspondence between pixels of said baseline object and pixels of said registered shape, and
mapping said probability for said feature in said baseline object from said probabilistic atlas to pixels of said registered shape, to obtain a probability image for said feature in said object.

17. The apparatus according to claim 11, further comprising:
a preprocessing unit for obtaining said shape of said object by detecting clusters of pixels belonging to said object.

18. The apparatus according to claim 11, wherein said object is a breast, said feature is a cancer structure, and said probabilistic atlas stores probabilities for said cancer structure in said baseline object.

19. The apparatus according to claim 11, further comprising:
a training unit for training using a plurality of training objects including said feature, to generate said baseline object, said shape model, and said probabilistic atlas, said training unit training by
generating said baseline object by aligning shapes of said plurality of training objects using centers of mass of said plurality of training objects,
determining deformation modes to describe shape deformations between said shapes of said plurality of training objects and said baseline object,
performing training shape registration for said plurality of training objects by fitting said shapes of said plurality of training objects using combinations of said deformation modes, to obtain a plurality of registered training shapes, and
generating said probabilistic atlas by mapping locations of said feature from said plurality of training objects to said baseline object, using said plurality of registered training shapes.

20. The apparatus according to claim 19, wherein said training unit
generates said baseline object by
obtaining a map of pixel frequencies for said shapes of said plurality of training objects, after aligning said shapes of said plurality of training objects, and
thresholding said map of pixel frequencies at a predetermined frequency to obtain said baseline object, and
determines deformation modes by
placing control points on edges of said baseline object,
generating a deformation grid using said control points,
warping said control points from said baseline object to said shapes of said plurality of training objects using said deformation grid to obtain warped control points,
obtaining shape parameterizations for said shapes of said plurality of training objects using said warped control points, and
extracting said deformation modes using Principal Component Analysis for set of said shape parameterizations, to obtain said deformation modes as principal components.

* * * * *